United States Patent
Gibson et al.

(10) Patent No.: US 7,906,007 B2
(45) Date of Patent: *Mar. 15, 2011

(54) OPTIMIZING PHOTOVOLTAIC-ELECTROLYZER EFFICIENCY

(75) Inventors: Thomas L. Gibson, Utica, MI (US); Nelson A. Kelly, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1134 days.

This patent is subject to a terminal disclaimer.

(21) Appl. No.: 11/566,702

(22) Filed: Dec. 5, 2006

(65) Prior Publication Data

US 2007/0119718 A1 May 31, 2007

Related U.S. Application Data

(63) Continuation-in-part of application No. 11/049,213, filed on Feb. 2, 2005, now Pat. No. 7,510,640.

(60) Provisional application No. 60/545,379, filed on Feb. 18, 2004, provisional application No. 60/750,691, filed on Dec. 15, 2005.

(51) Int. Cl.
*C25B 1/04* (2006.01)

(52) U.S. Cl. ........................................ 205/637; 205/628

(58) Field of Classification Search .................. 205/628, 205/637
See application file for complete search history.

(56) References Cited

U.S. PATENT DOCUMENTS

| | | | |
|---|---|---|---|
| 4,341,607 | A | 7/1982 | Tison |
| 5,658,448 | A | 8/1997 | Lasich |
| 6,583,523 | B1 | 6/2003 | Bhate |
| 2002/0051898 | A1 | 5/2002 | Moulthrop, Jr. et al. |
| 2002/0063552 | A1 | 5/2002 | Arakawa |
| 2004/0219398 | A1 | 11/2004 | Calhoon |
| 2005/0189234 | A1 | 9/2005 | Gibson et al. |

OTHER PUBLICATIONS

Int. Search Report for PCT/US06/61642, Dec. 6, 2006, GM Global Technology Oper.

*Primary Examiner* — Alexa D. Neckel
*Assistant Examiner* — Nicholas A. Smith
(74) *Attorney, Agent, or Firm* — Reising Ethington P.C.

(57) ABSTRACT

An array of photovoltaic (PV) module(s) is arranged in series and/or parallel electrical connection to deliver direct current electrical power to an electrolyzer to produce hydrogen. The electric power is delivered by the array at its maximum power point ($V_{mpp}$) to deliver $I_{oper}$ at $V_{oper}$ for the electrolyzer. The arrangement of the PV modules in the array, or the arrangement of cells in the electrolyzer, is continually monitored and controlled by an automatic controller system to operate the PV and electrolyzer systems at or near their respective maximum efficiencies. A DC-DC converter may be used to adjust the $V_{mpp}$ to the operating voltage of the electrolyzer.

15 Claims, 9 Drawing Sheets

OPTIMIZING PHOTOVOLTAIC-ELECTROLYZER EFFICIENCY

CROSS REFERENCE TO RELATED APPLICATIONS

This application is a continuation-in-part of co-pending application Ser. No. 11/049,213, now U.S. Pat. No. 7,510,640, titled "Method and Apparatus for Hydrogen Generation," and filed Feb. 2, 2005. The disclosure of this parent application is incorporated herein by reference. The parent application also claims priority based on U.S. provisional application 60/545,379, filed Feb. 18, 2004. This application also claims priority based on provisional application 60/750,691, filed Dec. 15, 2005, titled "Methods for Optimizing Photovoltaic-Electrolyzer Efficiency to Generate Hydrogen," and which is incorporated herein by reference.

TECHNICAL FIELD

This invention pertains to hydrogen production by electrolytic decomposition of water. More specifically this invention pertains to optimized use of photovoltaic modules to supply power for electrolytic production of hydrogen from water.

BACKGROUND OF THE INVENTION

As disclosed in the above identified parent application, solar hydrogen generation by photovoltaic-electrolyzer (PV-electrolyzer) systems is a renewable and environmentally beneficial energy source for fuel cell vehicles and other applications utilizing hydrogen as a fuel. But the photovoltaic system and the hydrogen-producing electrolyzer are separate and distinct operating devices whose usage and operations must be coordinated to achieve suitable operating efficiencies for each when they are used in combination.

A photovoltaic system typically comprises a group of individual planar solar cells arranged in rows and columns in a flat panel called a module. Each cell in a module is typically made of the same chemical material having the property of converting incident solar radiation to an electrical potential. Materials for such photovoltaic cells include, for example, crystalline silicon, amorphous silicon, copper-indium-selenium ($CuInSe_2$), or cadmium-tellurium (CdTe). A representative cell membrane might, for example, produce an open-circuit, direct current electrical potential of 0.6 V at a cell membrane temperature of 25° C. when receiving solar radiation of 100 $mW/cm^2$ (one sun irradiance). The several cells in a planar module may be arranged and electrically connected to produce a specified operating voltage and direct current at a specified temperature and under specified sun irradiance and operating load conditions. Two or more modules may be connected in series or parallel electrical connection in a group of modules called an array.

There are also known electrolyzer systems for the electrolytic dissociation of water into hydrogen and oxygen. Examples include alkaline electrolyzers, proton exchange membrane (PEM) electrolyzers, steam electrolyzers and high pressure electrolyzers. For many applications an alkaline electrolyzer may be preferred. The electrolyzer typically consists of a group of individual cells that are interconnected electrically to obtain a desired rate of hydrogen production using specified electrical power parameters. The individual alkaline water electrolyzer may, for example, comprise an aqueous potassium hydroxide (5M KOH) electrolyte, a platinum or nickel cathode (for hydrogen) and a suitably catalyzed anode for oxygen generation.

In the design of a specific hydrogen generation operation the electrolyzer is designed and specified for a desired hydrogen production rate. The electrolyzer design will have specified number of electrolyzer cells at a DC voltage/cell of about 1.6 volts and an electrical power requirement for the scheduled hydrogen production rate and operating temperature range of the system. The several electrolytic cells may be arranged in series or parallel electrical connection. A photovoltaic system is then provided with the capability of efficiently delivering electrical power to the electrolyzer.

It has been recognized that a given PV system of cells and modules has a maximum power point voltage for the system that is found from a predetermined relationship between an actual voltage and actual current under load. It is recognized that improved efficiencies are gained by modifying the number of electrolyzer cells so that a PV system can be operated at its maximum power point voltage. Conversely, the number of modules in the PV system can be varied so that the load required by the electrolyzer matches the revised the reconfigured PV system. However, the operations of the PV system and electrolyzer system can vary. For example, the operation of the PV system is particularly subject to variation in ambient temperature and solar irradiance. In this example, there is a continual need to recognize changing operating characteristics of the PV system and adapt the overall operation of the PV-electrolyzer to such changes in order to maintain operating efficiencies of the combined systems.

Accordingly, there remains a need for practices for optimizing the operation of a group of photovoltaic modules (arrays) in combination with an electrolyzer with a group of cells for the electrolysis of water into hydrogen and oxygen.

SUMMARY OF THE INVENTION

Methods are provided for design and/or operation of a solar-powered photovoltaic-electrolyzer system for efficient production of hydrogen from water. The methods are applicable generally to electrolyzer systems and photovoltaic systems. The aim of the methods is to enable each separate system, photovoltaic and electrolyzer, to operate efficiently in their combination.

The electrolyzer is sized based on a design hydrogen production rate. The hydrogen production rate will permit calculation of an operating direct current ($I_{oper}$) and a specification of a number of electrolytic cells connected in series. Some electrolyzer cells may also be arranged in parallel electrical connection. The operating voltage ($V_{oper}$) will be estimated from the number of cells in electrical series connection. Testing of the system will provide accurate confirmation of operating current and voltage values for the electrolyzer and a suitable operating temperature or temperature range for most efficient operation of the electrolyzer. A goal of the practice of this invention is to provide a photovoltaic (PV) system for powering the specified electrolyzer such that the PV system is able operate at a most efficient voltage level in delivering direct current power to the electrolyzer.

A PV system is organized to comprise an array of individual modules that may be arranged with series or parallel electrical connections. For example, an array of PV modules may be organized with some modules connected in series to provide a suitable operating voltage for the electrolyzer and some connected in parallel to provide a suitable operating current for the required hydrogen production rate. The maximum power point of each module is determined and recorded and its variation in operation with its temperature is determined and recorded.

Voltage and current sensors are connected to measure the operating voltage and current, of the photovoltaic-electrolyzer system, and temperature sensors are installed to measure the operating temperature of the photovoltaic modules. Then, a control system, comprising logic systems, control algorithms, electronic controllers, and switches (solenoid or other) may be connected to the voltage, current, and temperature sensors, to control the operation and efficiency of the photovoltaic-electrolyzer system based on the sensor measurements. The control system functions to continuously optimize the system operation and efficiency by using signals from the sensors to rearrange, as may be found necessary, the number of solar cells or modules connected in series and in parallel circuits in the photovoltaic system to maintain the optimum PV system output voltage, equal to the desired electrolyzer operating voltage. Different arrays of the modules are formed to maintain efficient system operation.

Alternatively, the system operation and efficiency may be continuously optimized by using signals from the control system to control the number of electrolysis cells connected in series and in parallel circuits in the electrolyzer to maintain the optimum system operating voltage. Alternatively, the system operation and efficiency may be continuously optimized by using signals from the control system to control the output voltage of a DC-DC converter or charge controller to maintain the optimum system operating voltage. One or a combination of the alternative control scenarios can be used to control the PV-electrolyzer operation.

Often the operating temperature of photovoltaic modules increases during operation and reduces their electrical output. Cooling of the modules (by spray of a cooling fluid or the like) can be used to maintain their operation at a desired maximum power point.

Objects and advantages of the invention will be further understood from a detailed description of preferred practices and embodiments which follow.

DESCRIPTION OF PREFERRED EMBODIMENTS

Figure 1:
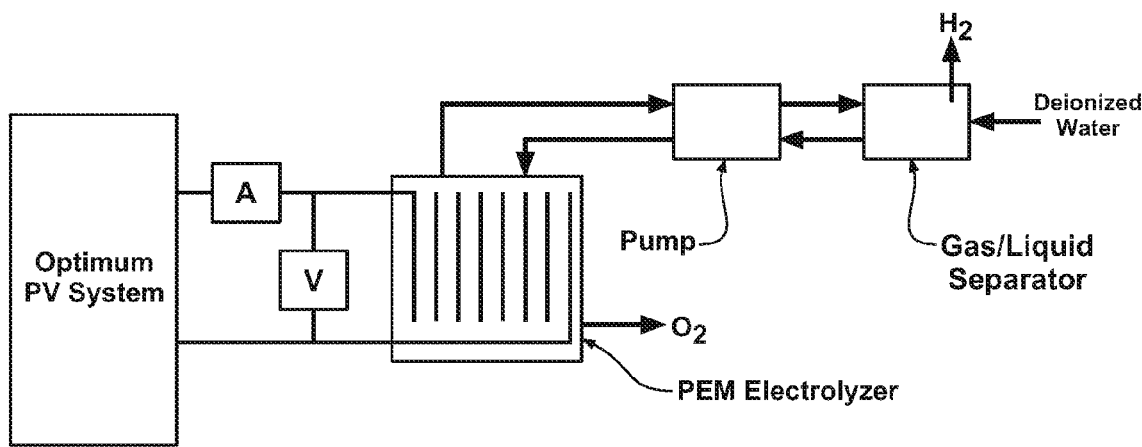
FIG. 1 is a schematic representation of a PV electrolyzer system with a direct connection between the PV modules and the electrolyzer.

Two methods of electrically interconnecting photovoltaic modules (PV) with an electrolyzer for the production of hydrogen are used in the practice of this invention. In one of these methods the PV system is wired directly in series to the electrolyzer system (FIG. 1). In the second method, a DC-DC converter is wired in the circuit, in series, between the PV system and the electrolyzer (FIG. 2), a process also called maximum power point tracking.

In the schematic illustration of FIG. 1, a multi-module photovoltaic system (box labeled Optimum PV System) is connected directly to a multi-cell electrolyzer for the electrolytic decomposition of water into hydrogen and oxygen utilizing a proton exchange membrane (box labeled PEM Electrolyzer). An ammeter (box A) and voltmeter (box V) are used to continuously monitor the DC electrical potential and current flow from the PV system to the electrolyzer. Oxygen ($O_2$) is produced at the cathodes of the electrolyzer cells and the separate streams gathered and conducted out of the electrolyzer for a desired use. Hydrogen ($H_2$) is produced at electrolyzer anodes. The evolution of hydrogen is vigorous and entrains liquid. In this embodiment, the hydrogen streams from the several cells are gathered into a common stream which is washed with deionized water. The water is separated from the hydrogen product in Gas/Liquid Separator and pumped back to the PEM Electrolyzer.

Preferably, the operating temperatures of the Optimum PV System and the PEM Electrolyzer are continually measured by thermocouples, or the like, not illustrated in FIG. 1.

In this embodiment of the invention, the PV system is connected directly with the electrolyzer. The PV system is continually optimized for efficient joint operation with the electrolyzer without the use of an interposed DC-DC converter. The PV system is continually configured electrically so that its maximum power point voltage is close to the operating voltage of the electrolyzer.

Figure 2:
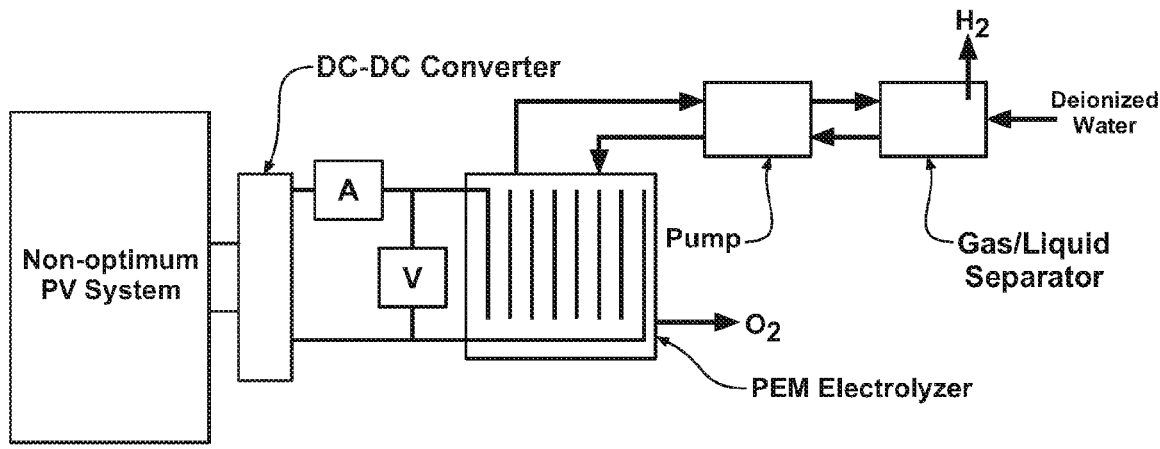
FIG. 2 is a schematic representation of a PV electrolyzer with a DC-DC converter interposed between the PV modules and the electrolyzer.

In the schematic illustration of FIG. 2, a DC-DC Converter is interposed in the electrical connection between a Non-optimum PV System and the PEM electrolyzer. The other elements of the PV-electrolyzer operating are as described with respect to FIG. 1. In this embodiment of the invention, the DC-DC converter is used to balance differences between the maximum power point voltage of the Non-optimum PV System and the operating voltage of the electrolyzer.

In the practice of this invention a predictive model is used to determine the efficiency of any PV-electrolyzer system based on the electrical characteristics of the circuit elements and to select the optimum electrical specifications for the PV modules, electrolyzer, and DC-DC converter (if any) to be used in designing a system for optimum hydrogen production. The predictive model is used to devise a practical, stepwise procedure for optimized construction and operation of a PV-electrolyzer system. The models and optimization procedure may be used to optimize any PV-electrolysis system including those with PEM, alkaline, steam, high pressure, and other types of electrolyzers and furnish optimum design specifications to build PV solar hydrogen systems.

A PV powered PEM electrolyzer is a more effective means of hydrogen generation if the two units are integrated to optimize their combined efficiency. Chiefly, the maximum power point (MPP) of the PV system must match the characteristic operating voltage of the electrolyzer to maximize the efficiency of the PV-electrolyzer system. If the PV system has a MPP voltage ($V_{mpp}$) different from the operating voltage ($V_{oper}$) of the electrolyzer, the PV modules working at a non-optimum voltage will produce less power for the electrolysis process and their efficiency of operation (their electrical energy output divided by their solar irradiance input) will be decreased. The farther $V_{mpp}$ is from $V_{oper}$ along the characteristic IV curve of the particular PV modules used in the system, the lower will be the percentage efficiency of solar energy conversion to hydrogen energy.

Figure 3:
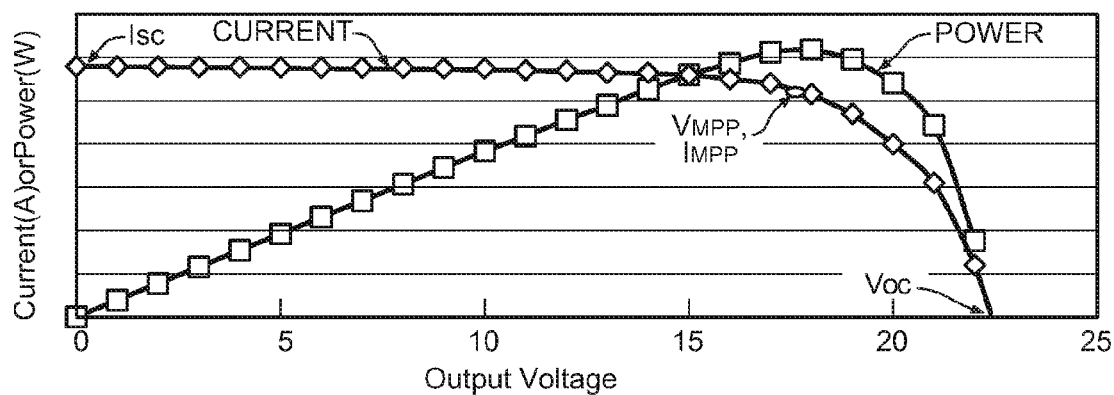
FIG. 3 is a graph of current (A) or power (W) for a typical photovoltaic module showing the Maximum Power Point (MPP). MPP is the point on the graph of PV current output versus voltage where the power output is a maximum. The corresponding curve of power (P=V×I) versus voltage is also shown.

$V_{mpp}$ is the voltage at MPP. FIG. 3 is a graph of current (A) or power (W) for a typical photovoltaic module showing the Maximum Power Point (MPP). MPP is the point on the graph of PV current output versus voltage where the power output is a maximum. The corresponding power curve (P=V×I) is also shown.

$V_{oper}$ is a characteristic voltage at which the electrolyzer operates due to its electrode and membrane materials, their catalyst coatings, and its electrolyte (in a PEM electrolyzer the water-flooded membrane between the electrodes acts as the electrolyte). $V_{oper}$ of the electrolyzer is the sum of the standard water splitting voltage plus the overvoltage of the electrolyzer multiplied by N, the number of electrolysis cells in series within the electrolyzer circuit (Equation 1). All values are in direct current (DC).

$$V_{oper} = N \times (1.23 \text{ volts/cell} + \text{overvoltage/cell}) \quad \text{Equation 1:}$$

The overvoltage in a 20-cell PEM electrolyzer used in several tests was 0.4 volts/cell so that $V_{oper}$ was 32-33 volts.

The overall efficiency of the PV-electrolyzer system may be measured directly, as it was in this study, by measuring the solar irradiance and the area of the PV solar cells to obtain the input energy and measuring the current flowing through the electrolyzer using a low resistance ammeter in the circuit, which is then multiplied by the standard voltage for water electrolysis to determine the energy of the hydrogen generated. The hydrogen energy production was also calculated from the hydrogen volume measured with a calibrated flow meter as a check on the results. All these methods indicated the same system efficiency (the solar hydrogen production efficiency) within ±4%. The methods of calculating system efficiency from the operating current and hydrogen flow are shown in Equation 2 and Equation 3.

Equation 2:
$$\text{Solar to } H_2 \text{ efficiency} = \frac{I_{oper}(\text{mA}) \times N \times 1.23 \text{ volts}}{PV \text{ area } (m^2) \times \text{Solar Irradiance } (W/m^2)} \times 100\%$$

Equation 3:
$$\text{Solar to } H_2 \text{ efficiency} = \frac{H_2 \text{ flow} \times H_2 \text{ } LHV \times H_2 \text{ density}}{PV \text{ area } (m^2) \times \text{Solar Irradiance } (W/m^2)} \times 100\%$$

Where $H_2$ flow=measured flow rate in L/h at one atmosphere and 298K, $H_2$ LHV=$H_2$ lower heating value=33.35 kWh/kg, $H_2$ density factor=0.002 kg/24.45 L at 298 K and 1 atmosphere, and Solar irradiance=solar energy in $W/m^2 \times PV$ active cell area of module in $m^2$.

Understanding the efficiency and optimization of PV-electrolysis is made more difficult, however, because at least two units, a PV system (the power source) and an electrolyzer (the operating load), must be integrated to make hydrogen. Each unit has its own efficiency, and instead of having a single independent efficiency level, the two units interact so that the PV system affects the efficiency of the electrolyzer and the electrolyzer determines affects the efficiency of the PV system. The results of modeling PV-electrolyzer efficiency in a direct-connection system are shown in Table 1, which gives, for each PV system tested, the voltage at the MPP under Standard Test Conditions (STC, 25° C.), the data used to calculate the efficiency of each PV system at $V_{oper}$, the efficiency of the electrolyzer, and the resulting system efficiency under the operating conditions, including effects of PV temperature (that often rises well above STC) and the operating voltage of the electrolyzer (load) that may force the PV system to operate above or below the MPP voltage. Equation 4 is the basis for the model of a direct-connection PV-electrolyzer in Table 1: System efficiency is the product of the PV efficiency corrected for temperature effects times the electrolyzer efficiency.

System Efficiency=(PV electrical efficiency at $V_{oper}$ − PV temperature correction)×Electrolyzer Efficiency at $V_{oper}$   Equation 4:

If DC-DC converter PV-electrolysis is used, there is an additional term in the model (Equation 5).

System Efficiency=(PV electrical efficiency at $V_{oper}$ − PV temperature correction)×Electrolyzer Efficiency at $V_{oper}$×DC-DC Converter Efficiency   Equation 5:

In both models (Equations 4 and 5), it is assumed that wire losses due to resistance in the wiring connecting the circuit elements are minimized by using sufficiently heavy gauge wire to carry the expected operating current according to standard rules used for DC electrical systems. Since resistance losses in wiring and connections are low (<1%), no term for these losses is included in the models.

The electrolyzer efficiency (FIG. 4) can be calculated from the measured value of $V_{oper}$ under the actual conditions present during the operation of the PV-electrolyzer system (Equation 6).

To determine the efficiency of the electrolyzer, we used the theoretical standard electrolysis voltage (1.23 volts/cell) divided by the measured $V_{oper}$ of the electrolyzer with N electrolysis cells in series.

Equation 6:

$$\text{Electrolyzer Efficiency at } V_{oper} = \frac{100\% \times N \text{ (cells)} \times 1.23 \text{ volts/cell}}{V_{oper}}$$

Figure 5:
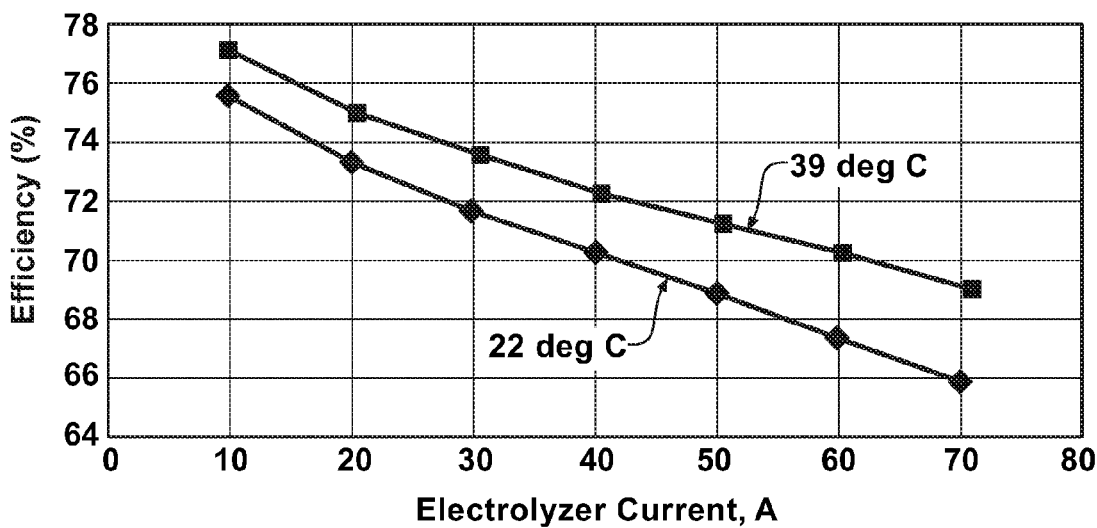
FIG. 5 is a graph illustrating effects of current and temperature on PEM electrolyzer efficiency. Electrolyzer efficiency in percent was plotted versus operating current at temperatures of 22° C. and 39° C.

If desired, the electrolyzer efficiency can be measured in advance at a range of operating currents and temperatures (FIG. 5). The efficiency of the electrolyzer can then be predicted from the measured temperature and the efficiency curves in FIG. 5. The values of electrolyzer efficiency calculated from the measured $V_{oper}$ (column G in Table 1) were used in the model because they were readily available and more accurate than any predicted values.

The 20-cell PEM electrolyzer (referred to above) having an operating voltage of 32-33 volts was operated using a number of different commercial photovoltaic modules identified by number (e.g., #3) in column A of Table 1. The $V_{mpp}$ at 25° C. of the respective module or combination of modules arranged in series or parallel electrical connection is reported in column B of the table. Various operating characteristics and efficiencies, determined using the above equations, of the PV module(s) and electrolyzer are presented in the several columns of Table 1. It is seen that some modules did not produce sufficient voltage to operate the specific electrolyzer.

TABLE 1

Model for Direct-Connection PV-Electrolyzer Efficiency

| A<br>PV Modules | B<br>$V_{mpp}$ at STC (25 C) (volts) | C<br>$V_{oper}/V_{mpp}$ | D<br>Fraction PV Effic at $V_{oper}$ from IV, P curves | E<br>PV cell efficiency at MPP (%) | F<br>D × E = PV cell efficiency at $V_{oper}$ (%) | G<br>Electrolyzer Efficiency = N × 1.23/$V_{oper}$ | H<br>F × G = Model Uncorrected Efficiency (%) | I<br>PV Temp minus 25 C. | J<br>H − (I × 0.45%) = Temp Corrected Model Efficiency |
|---|---|---|---|---|---|---|---|---|---|
| # 3 | 17.0 | 1.88 | 0 | 13.3 | 0.0 | 0.000 | 0.0 | 10 | 0.0 |
| # 8 | 20.0 | 1.60 | 0 | 13.4 | 0.0 | 0.000 | 0.0 | 10 | 0.0 |
| # 8 & # 9 parallel | 20.0 | 1.60 | 0 | 13.4 | 0.0 | 0.000 | 0.0 | 10 | 0.0 |
| # 8 & # 15 series | 30.0 | 1.07 | 0.91 | 13.4 | 12.2 | 0.560 | 6.8 | 12.5 | 6.4 |
| # 12 | 33.0 | 0.97 | 1 | 11.5 | 11.5 | 0.781 | 9.0 | 10 | 8.6 |
| # 16 | 34.6 | 0.92 | 0.98 | 14.6 | 14.3 | 0.766 | 11.0 | 10 | 10.5 |
| # 13 | 36.2 | 0.88 | 0.95 | 17.5 | 16.6 | 0.764 | 12.7 | 5 | 12.4 |
| # 8 & # 9 series | 40.0 | 0.80 | 0.9 | 13.4 | 12.1 | 0.757 | 9.1 | 10 | 8.7 |
| # 13 & # 15 series | 46.2 | 0.69 | 0.78 | 15.5 | 12.1 | 0.778 | 9.4 | 14 | 8.8 |
| # 11 | 51.4 | 0.62 | 0.73 | 16.1 | 11.8 | 0.781 | 9.2 | 10 | 8.8 |
| # 10 & # 11 parallel | 52.7 | 0.61 | 0.7 | 16.7 | 11.7 | 0.764 | 8.9 | 10 | 8.5 |
| # 10 | 54.0 | 0.59 | 0.65 | 17.3 | 11.2 | 0.781 | 8.8 | 10 | 8.4 |
| # 12 & # 16 series | 67.6 | 0.47 | 0.53 | 13.1 | 6.9 | 0.786 | 5.5 | 14 | 5.1 |
| # 13 & # 16 series | 70.8 | 0.45 | 0.5 | 16.1 | 8.1 | 0.781 | 6.3 | 9.7 | 6.0 |
| # 10 & # 12 series | 87.0 | 0.37 | 0.4 | 14.4 | 5.8 | 0.788 | 4.5 | 13 | 4.3 |
| # 10 & # 13 series | 90.2 | 0.35 | 0.38 | 17.4 | 6.6 | 0.786 | 5.2 | 16.6 | 4.8 |
| # 10 & # 11 series | 105.4 | 0.30 | 0.34 | 16.7 | 5.7 | 0.783 | 4.4 | 10 | 4.2 |

The proceeding portion of this specification has described how efficiencies of operation of a multi-module PV system and a multi-cell electrolyzer may be determined for in optimization practices of this invention. Now attention is turned to the optimization process.

Stepwise Optimization Procedure

A series of nine steps is used to measure and optimize the efficiency of solar-powered PV-electrolysis. The complete stepwise optimization procedure illustrated with 2-4 example cases is given below.

The stepwise procedure begins by characterizing the electrolyzer. The first step requires operating the electrolyzer at the desired hydrogen generation rate until the electrolyzer reaches a steady state temperature and, then, measuring the operating current, voltage, and temperature:

Step 1—

The electrolyzer current ($I_{oper}$) required for the desired hydrogen generation rate is calculated by using Faraday's Law (Equation 7).

Equation 7:

$$I_{oper} = \frac{26{,}806 \text{ amps per kg hour} \times \text{desired hydrogen generation rate}}{N}$$

where 26,806 amps per kg per hour is equivalent to Faraday's constant (96,500 Coulombs/g hydrogen) and N is the number of electrolysis cells in series within the electrolyzer circuit.

The electrolyzer is connected to a variable DC power supply, and the power output is increased until the current flow ($I_{oper}$) is equivalent to the desired hydrogen generation rate determined using Faraday's Law. A constant operating temperature is necessary, because increasing the temperature within the permissible temperature range of the electrolyzer increases its efficiency and hydrogen generation rate. The temperature reaches a steady state (constant temperature) that depends on the power input and cooling water flow rate and temperature. In practice, the steady state temperature is determined by measuring the electrolyzer stack temperature using a temperature sensor (thermocouple or thermometer) attached to the stack plates or electrolysis cells. When steady state is established (temperature no longer changing), operating current in the electrolysis circuit is measured using an ammeter in series with the electrolyzer, and operating voltage is measured using a voltmeter connected in parallel with the electrolyzer (as illustrated in FIGS. 1 and 2). A procedure including recording and plotting the operating voltage, current, and temperature until the electrolyzer reaches a steady state at the desired target hydrogen generation rate can help to determine the steady-state current and temperature.

EXAMPLE CASE 1

—In a hypothetical example of optimizing a PV-electrolyzer system, we need 0.5 kg of hydrogen per day to operate a single fuel cell vehicle, and the PV-electrolyzer system operates for 6 hours during daylight. The hydrogen generation rate will be 0.5 kg/6 hours=0.083 kg/hour.

From Equation 7: the steady state current in a 20-cell electrolyzer will be 0.083 kg/hour×26806 amps/kg/hour/20=111 amps The steady state current after warm up is maintained at 21° C. The measured operating voltage is 40 volts.

Case 2—Control Example (Not to be Optimized):
  All conditions were the same as Case 1.
  We will consider up to four cases with different modifications in the design of a PV-electrolyzer system, the same series of calculations will be carried out in each case to determine the effect of the modifications on the efficiency of PV-electrolyzer systems.

Step 2—

The electrolyzer efficiency under steady-state conditions (constant temperature, voltage, and current at the desired hydrogen flow rate) is calculated using Equation 6, i.e., efficiency=1.23 volts×1/(operating voltage per electrolysis cell).

In example, Case 1,
From Equation 6, the electrolyzer efficiency is

Efficiency=100%×20×1.23 volts/40 volts=62%

Case 2—Control Example (Not to be Optimized):
  All conditions were the same as Case 1.

Figure 4:
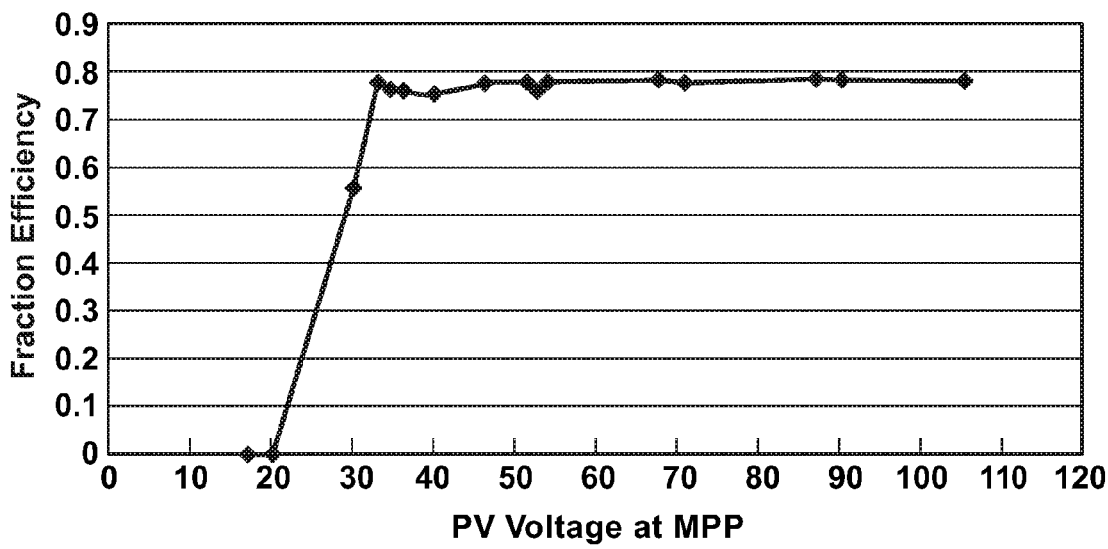
FIG. 4 is a graph of estimated electrolyzer efficiency for a 20-cell PEM electrolyzer directly connected to PV modules with a range of MPP voltages.

The measured electrolyzer efficiencies for 17 examples of PV-electrolyzer systems are plotted in FIG. 4. When $V_{mpp}$ of the PV system was less than 30 volts, the PEM electrolyzer lacked sufficient energy to split water's chemical bonds, no current flowed, and efficiency was zero. At a $V_{mpp}$ of 30 volts, current begins to flow, but both the current and volume of hydrogen produced indicate that the solar hydrogen generation efficiency is only 6.8% and, therefore, from Equation 4, the electrolyzer efficiency is only 56% (0.56). When the $V_{mpp}$ reached 33 volts the electrolyzer gave its maximum efficiency (78%) and maintained an approximately constant efficiency at this level (76-79%) in the other PV-electrolysis tests in which ambient temperature (20-23° C.) was maintained.

Using a gas flow meter connected to the hydrogen outlet of the electrolyzer is an alternate or supplemental means for measuring the hydrogen generation rate. The electrolyzer efficiency can be calculated from the hydrogen flow rate using Equation 8.

Equation 8:

$$\text{Electrolyzer efficiency}(\%) = \frac{H_2 \text{ gen. rate (kg/hour)} \times 33.3 \text{ kWh/kg}}{1 \text{ hour} \times I_{oper} \times V_{oper}/1000 \text{ W/kW}} \times 100\%$$

In example Case 1: the measured hydrogen generation rate is 0.0833 kg/hour:

Efficiency=100%×0.083×33.3/(111×40/1000)=62% From Equation 8:

Case 2—Control Example (Not to be Optimized):

Efficiency=100%×0.083×33.3/(111×40/1000)=62% (the same)

Step 3—

In some circumstances, the operating efficiency of the electrolyzer during hydrogen generation can be increased as part of a procedure for optimizing solar powered hydrogen production. This is an optional step that should be considered.

In circumstance #1, when the present hydrogen generation rate is greater than necessary to make the required hydrogen for fuel or other desired uses, select an alternative, lower target hydrogen generation rate by decreasing the electrolyzer operating current. As shown in FIG. 5, decreasing the operating current improves efficiency. The estimated improvement in efficiency, $\Delta_I Eff$ (%)=0.17%/amp×$I_{oper}$.

In circumstance #2, when the electrolyzer operating temperature is below the maximum operating temperature permitted by the electrolyzer durability and safety requirements, increase the steady-state operating temperature by reducing the flow rate of the circulating water or by using artificial means of heating the electrolyzer (such as heating the circulating water). As shown in FIG. 5, increasing the electrolyzer operating temperature improves efficiency. The increase in efficiency is $\Delta T$ Eff (%)=0.13%/deg C.×$\Delta T$. [Note: Water or an electrolyte mixture such as water and KOH is circulated through the electrolysis cells of electrolyzers to supply the water for conversion to hydrogen and oxygen. The circulating water also passes through a cooling device such as a radiator and serves to cool the electrolyzer which is heated during operation due to the overvoltage that must be applied.]

Reducing the operating current to improve efficiency also reduces the hydrogen generation rate of the PV-electrolyzer system. There is a trade-off of lower hydrogen production (and higher cost per kg of hydrogen) for improved efficiency. If the decrease in hydrogen production is unacceptable, N, the number of electrolysis cells in series, can be increased to make up for the loss. The hydrogen production rate from Hydrogen rate=$I_{oper}$/(N×26,806 amps/kg/hour).    Equation 7 is:

The number of cells can be increased up to 50% or more without exceeding practical electrolyzer design limits.
In the example, Case 1:

We increase the electrolyzer efficiency by increasing the temperature from 21° C. to 50° C. and decreasing the current from 111 amps to 89 amps. After these changes:

$$\Delta_T Eff (\%) = 0.13\%/deg\ C \times \Delta T$$
$$= 0.13 \times 29$$
$$= 3.8\%$$

$$\Delta_I Eff (\%) = 0.17\% / amp \times I_{oper}$$
$$= 0.17 \times 22$$
$$= 3.7\%$$

The new efficiency will be:

Electrolyzer efficiency=62%+3.8%+3.7%=70% The new hydrogen generation rate will be    (from Equation 7):

Hydrogen rate=$I_{oper}$/(N×26,806 amps/kg/hour) =89× 20/26,806=0.066 kg/hour

Although the electrolyzer efficiency was increased by lowering the current, the total hydrogen production may have become too little: 0.066 kg/hour only produces 0.4 kg of hydrogen in 6 hours of full sunlight (1000 W/m² irradiance) per day.

The hydrogen output can be brought back to 0.100 kg/hour (0.6 kg/6 hours of sunlight) by increasing N, the number of electrolysis cells in series, from 20 to 30. Again from Equation 7, Hydrogen rate=89×30/26,806=0.100 kg/hour.

In our example, Case 1, (from Equation 6) the electrolyzer operating Voltage will also be increased due to the increase in the number of electrolysis cells from 20 to 30:

$$V_{oper} = \frac{100\% \times N \times 1.23\ volts}{Electrolyzer\ Efficiency}$$
$$= \frac{(100 \times 30 \times 1.23)}{70}$$
$$= 53\ volts$$

Case 2—Control Example (Not to be Optimized):
Hydrogen rate=111×20/26,806=0.083 kg/hour.

Electrolyzer efficiency= 62%

$$V_{oper} = \frac{100\% \times N \times 1.23\ volts}{Electrolyzer\ Efficiency}$$
$$= \frac{(100 \times 20 \times 1.23)}{62}$$
$$= 40\ volts$$

In tests (FIG. 5), where much higher current (up to 70 amps) was applied to the electrolyzer from large DC-power supplies, the electrolyzer efficiency decreased gradually to about 72% as the operating current was increased. The electrolyzer efficiency increased, however, with increasing temperature. These data (FIG. 5) can be used to predict electrolyzer efficiency.

The solar power for operating the electrolyzer to make hydrogen fuel is provided by photovoltaic (PV) modules that convert solar radiation into electric power. The efficiency of a PV system used to power a load (an electrolyzer or any electrical appliance) depends upon the operating voltage of the load and the operating temperature of the PV modules. Increasing the operating temperature of a PV module causes a decrease in its electrical efficiency. The changes in PV module voltage, current, power, and efficiency per degree of temperature increase are expressed as temperature coefficients.

First the PV modules are characterized by tests to determine their maximum power point in the following steps of the optimization procedure. Alternatively, the voltage, current, power, maximum power point, efficiency, and temperature coefficients can be estimated from the manufacturer's specifications and product literature for the candidate PV modules that could be used for constructing the PV-electrolyzer. If the available PV specifications do not include the coefficients for the temperature-induced changes in voltage, current, and power, average values for the PV semiconductor material can be used. Crystalline silicon is the dominant PV semiconductor used today. The operating temperature of the PV modules can be measured continuously using a temperature sensor fastened to the back of the module (the simplest method). The operating temperature could also be predicted, because it is a function of ambient temperature, wind velocity, and solar irradiance (W/m²).

Step 4—

An electronic variable load device (with a voltmeter and ammeter) is connected to the PV module and is used to measure the PV voltage, current, maximum power point, efficiency, and temperature coefficients. The variable load circuit is shown schematically in FIG. 6.

The module (or group of connected modules) of solar-powered photovoltaic cells are connected to a variable load as part of a procedure for optimizing solar powered hydrogen production. A temperature measuring device is attached to the modules to continuously measure operating temperature, and the modules are positioned with the light-receiving surfaces directly facing the sun. Temperature is continuously measured until the modules reach a steady-state operating temperature. The solar irradiance (W/m$^2$) is continuously measured with a calibrated solar irradiance sensor.

Figure 6:
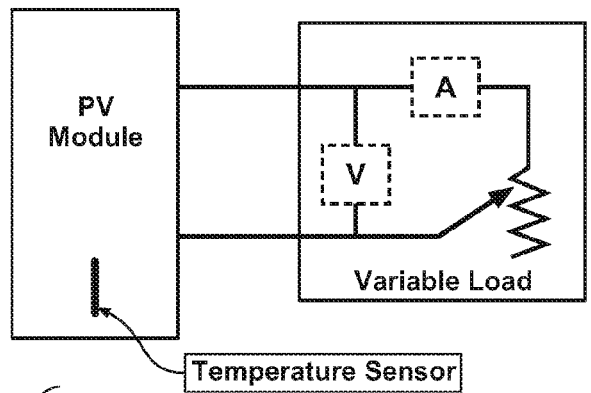
FIG. 6 is a simplified schematic of a variable load test apparatus with an internal voltmeter and ammeter (using a Hewlett-Packard Electronic Load Model 6060A)—used for scanning current-voltage curves of photovoltaic modules to measure the solar-electric efficiency and determine the maximum power point. Using a temperature sensor (thermocouple), the apparatus can also measure the effect of module temperature on solar-electric efficiency (temperature coefficients of current, voltage, and power).

A variable load (such as the Hewlett-Packard Electronic Load Model 6060A) is connected in series to the module or modules. The variable load device is an electronic device that functions as a variable resistance, a low resistance ammeter in series in the electrical circuit to measure input current, and a voltmeter in parallel with the electrical circuit to measure input voltage (FIG. 6). In addition to measuring current and voltage, the variable load device also measures the power. Using the variable load test system, the load applied to the module or modules is varied over the current range of the PV system from zero to the short circuit current ($I_{sc}$) while the operators measure the current, voltage, power, and temperature under the expected operating conditions during planned solar-powered hydrogen generation (usually the steady state operating conditions).

It is helpful next to plot power versus the voltage, where power is defined as voltage x current, to measure the maximum power ($P_{max}$) (see FIG. 3). Plotting current and power versus voltage makes it possible to observe the maximum power point of the power curve and the point on the IV plot at which the voltage is the maximum power voltage ($V_{mpp}$), and the current is the maximum power current ($I_{mpp}$), which correspond to the maximum power ($P_{max}=V_{mpp} \times I_{mpp}$).

Figure 7:
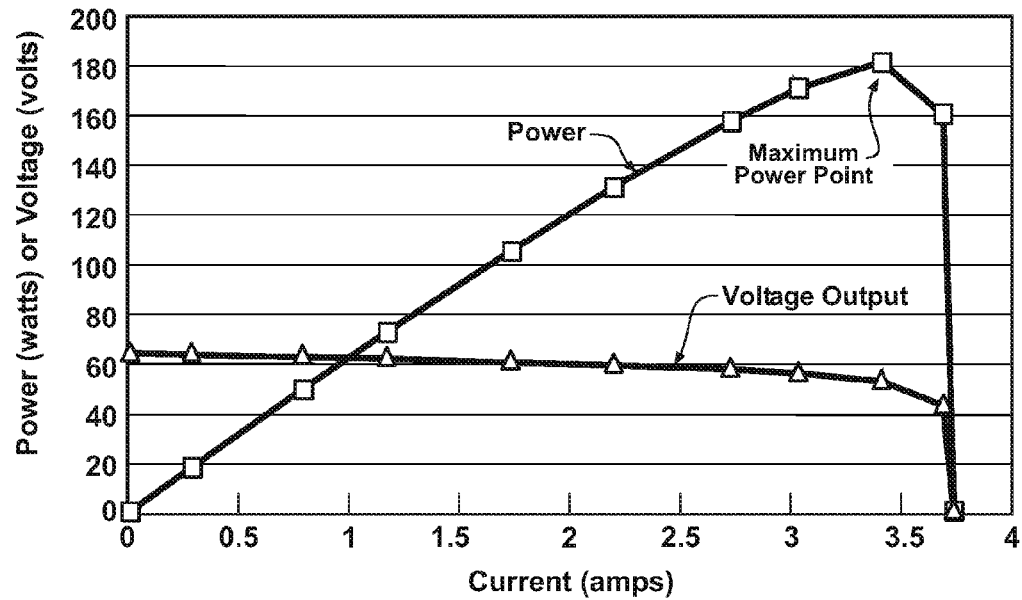
FIG. 7 is a graph of a scan of power and voltage output versus current for a Sanyo HIP-190 PV module (a layered crystalline and amorphous silicon material) at 41° C.

FIG. 7 shows the results of scanning and plotting the voltage, current, and power from a high efficiency PV module to find the maximum power point and measure $P_{max}$, $V_{mpp}$, $I_{mpp}$, the maximum PV efficiency using a variable load system (tested under bright, natural sunlight in Warren, Mich.).

Figure 8:
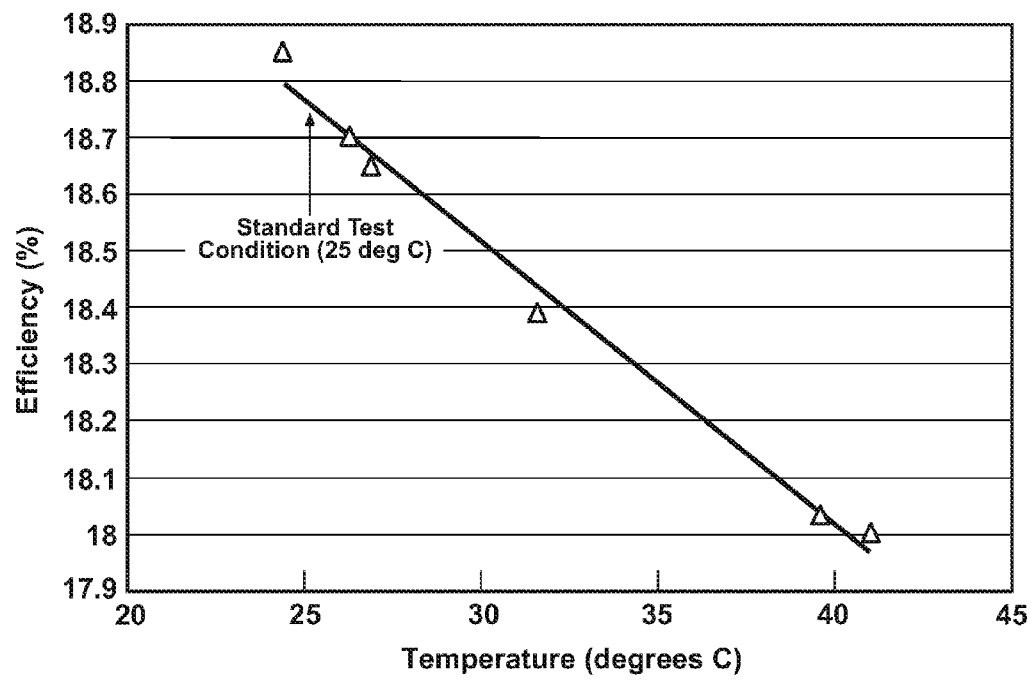
FIG. 8 is a graph illustrating the effect of temperature on the efficiency of Sanyo PV Module HIP-190 with the measured efficiency results fitted to a straight line (linear temperature coefficient of −0.3%/deg C.).

The effects of PV module temperature on voltage, current, and maximum power and efficiency can also be measured using the variable load system, and the results can be used to determine the temperature coefficients of the module. In FIG. 8, the effect of operating temperature changes on the electrical efficiency of a PV module at maximum power point (its optimum operating voltage) was determined by scanning a PV module six times at a range of operating temperatures. The change of 0.06 efficiency percentage per degree C corresponds to a temperature coefficient of—0.3%/degree C., i.e., the efficiency of 18.8% at STC (25 deg C.) falls by −0.3%×18.8%=−0.06% for each degree C. increase in temperature due to solar heating. When the temperature reaches 40 deg C., the efficiency will fall to 18.0%. The temperature coefficient for PV power output has the same magnitude as that for efficiency (−0.3%/deg C.), because efficiency=power output/$P_{max}$, where $P_{max}$ is a constant (the maximum power under STC).

Example Optimization Case 1:

For the PV module (Sanyo HIP-190) that we tested using the electronic variable load system as shown in FIGS. 7 and 8, we found that the measured:

Voltage at the MPP ($V_{mpp}$)=52 volts at 41° C. [from FIG. 7] [the $V_{mpp}$ at STC, 25° C., was 54.8 volts from the manufacturer specifications]

Power at MPP ($P_{max}$)=180 Watts 41° C. [from FIG. 7][the $P_{max}$ at STC was 190 W from the manufacturer specifications]

The maximum power current ($I_{mpp}$) from each PV module will be 180 Watts/52 volts=3.46 amps at 41° C.

Temperature coefficient of $P_{max}$ (% of total P/° C.)=−0.30% [from FIG. 8] [the coefficient was also −0.30% % of total P/° C. from the manufacturer specifications]

Temperature coefficient of $V_{mpp}$ (volts/° C.)~0.3%× 180 VA/3.46 A=0.16 volts/° C.

Case 2—Control Example (Not to be Optimized):

All PV module parameters were the same as Case 1.
Step 5—

Next, the effect of electrolyzer operating voltage on the efficiency of solar-powered photovoltaic-electrolyzer systems for generating hydrogen is optimized by the following procedure:

The method in steps 1 or 2 is used to measure the operating voltage and efficiency of the electrolyzer under steady state conditions required to generate the target flow rate of hydrogen production. Then, the method of Step 4 is used to measure the maximum power point voltage ($V_{mpp}$) and efficiency of several candidate photovoltaic modules or groups of interconnected modules under the expected operating conditions during planned solar-powered hydrogen generation. The most appropriate module or group of interconnected modules are selected that have a $V_{mpp}$ equal to the electrolyzer operating voltage to obtain the maximum efficiency from the photovoltaic system. This selection of the most appropriate module or modules is made by constructing a plot of photovoltaic module power and efficiency versus $V_{oper}/V_{mpp}$ for the modules under the expected operating conditions for hydrogen generation or alternatively selecting a module or group of interconnected modules with a power or efficiency curve plotted versus $V_{oper}/V_{mpp}$ that indicates the solar-powered photovoltaic system will maintain a desired percentage of the maximum efficiency at the steady state electrolyzer operating voltage ($V_{oper}$).

In Our Optimization Case 1:

The PV module (Sanyo HIP-190) that we characterized in Step 4 produces an output voltage of 54.8 volts (the $V_{mpp}$) at its maximum power output at 25° C. (the MPP under standard operating conditions of 25° C.). Since the electrolyzer optimized in Step 3 requires 53 volts (the operating voltage $V_{oper}$), the PV output voltage can be considered a good choice for use in the PV-electrolyzer system. For the PV modules to deliver 53 volts to operate the electrolyzer with high efficiency, either the modules must be designed to have a $V_{mpp}$ of 53 volts at the steady state operating temperature, or the steady-state operating temperature of the PV modules will need to be maintained near 25° C. (see Step 7, below). The slight excess of PV output voltage over operating voltage, 54.8 volts −53 volts=1.8 volts (3% excess), is helpful since the output voltage will drop if the operating temperature rises above 25° C., and there may be slight "copper" losses to reduce the voltage due to resistance in the wiring.

The PV modules will all be configured in parallel, i.e., connected together positive to positive and negative to negative, and connected directly to the electrolyzer. The number of PV modules will be:

Number of modules=89 amps/3.46 amps/module=26.

Total power at MPP ($P_{max}$)=26×180 watts=4680 watts at 41° C. [power calculated from the maximum power point determined in FIG. 7]

Case 2—Control Example (Not to be Optimized):

The PV modules will all be configured in parallel, i.e., connected together positive to positive and negative to negative, and connected directly to the electrolyzer. The number of PV modules will be:

$V_{oper}$=40 volts

From FIG. 7:

PV Power at $V_{oper}$=150 watts per module

Current ($I_{oper}$) at $V_{oper}$=150 watts/40 volts=3.75 amps

Number of modules=111 amps/3.75 amps/module=30

Total power=30×150 watts=4500 watts

Under these non-optimized conditions, more PV modules are used but give less power than Case 1.

Step 6—

An alternative method can be used for estimating the maximum power point voltage and optimizing the efficiency of a module or modules of solar-powered photovoltaic cells connected to a variable load as part of a procedure for optimizing solar powered hydrogen production by using the specifications provided in product literature by the manufacturer of the photovoltaic modules for the maximum power point voltage and maximum power at 25° C. (standard test conditions) and using a temperature measuring device attached to the module or modules to measure the steady-state operating temperature by the method of Step 4. The temperature coefficients provided by the manufacturer (or average temperature coefficients for the semiconductor and type of photovoltaic material) obtained from the literature can be used to estimate the maximum power point voltage and maximum power at the operating temperature (by using the temperature coefficients and operating temperature to correct the maximum power point voltage and maximum power at 25° C.).

Step 7—

Next, the following procedure can be used to increase the efficiency of a photovoltaic module or modules as part of a procedure for optimizing solar powered hydrogen production. First, a greater or lesser number of modules are connected in series to modify the output voltage of the total photovoltaic system to make it equal to the steady-state operating voltage of the electrolyzer by the direct connection method (see Step 5). Secondly, during the procedure of Step 5, a flow of cooling water or another fluid, gas, or liquid impinging on the module or modules can be used to decrease the steady-state module operating temperature. Alternatively, fluids carried in cooling coils, vanes, or vents touching or attached to the modules are used to decrease the steady state operating temperature. We have tested the effect of spraying cold water (21.4° C.) periodically onto a PV module and found that the module temperature was effectively reduced. Reducing the operating temperature during Step 5 increases the PV module $P_{max}$ and efficiency.

Additionally, there are circumstances where the only available PV system does not have an output voltage close enough to the operating voltage of the electrode for efficient PV-electrolyzer operation by the direct connection method (see Step 5). In that circumstance, DC-DC converters or charge controllers are connected in series between the modules and the electrolyzer to modify the output voltage of the total photovoltaic system to make it equal to the steady-state operating voltage of the electrolyzer. Because DC-DC converters add resistance to the circuit, the maximum efficiency with DC-DC converters is less than the maximum efficiency of direct connection PV-electrolysis although both methods can be used to supply a voltage equal to the operating voltage. Therefore, DC-DC converters are not used if the method in Step 5 can be used to make the output voltage of the PV system match the operating voltage of the electrolyzer.

In Optimization Case 1:

The steady state operating temperature of the PV modules during a cool windy period is 35° C. air In subsequent weeks, as the ambient temperature increases, a cooling liquid or gas is used to maintain a PV operating temperature of 35° C. whenever the ambient conditions of solar irradiance and wind velocity heat the module above that temperature. Maintaining the PV modules 10 degrees above the standard temperature of 25° C. will maintain the $V_{mpp}$ at 53 volts, the optimum level, which is equal to the $V_{oper}$ of the electrolyzer. If no cooling system is used, the solar irradiance will heat the modules to about 40° C. on cool sunny days and to more than 50° C. on hot sunny day, causing a drop in voltage and decreased efficiency.

$V_{mpp}$ at 35° C. = $V_{mpp}$ at 25° C. + (Temp coeff. × $\Delta T$)

= 54.8 volts + (−0.16 volts/° C. × 10° C.)

= 53.2 volts

Case 2—Control Example (Not to be Optimized):

Nothing is done to change the voltage, current output, or temperature of the PV system.

In Optimization Case 3:

The steady state operating temperature in another cool sunny period is 41° C. All the electrolyzer parameters are the same as Case 1 except that the redesigned electrolyzer in this case (Case 2) has 25 electrolysis cells connected in series giving a $V_{oper}$ of 45 volts.

The PV module was redesigned to have 83 solar cells in series to produce a $V_{mpp}$ of 45 volts at 41° C. [The original PV module in Case 1 had 96 solar cells connected in series to give 52 volts at 41° C.]

In Optimization Case 4:

All the electrolyzer parameters are as described in Case 1.

At the PV operating temperature, the only PV modules available for use have a $V_{mpp}$ of 36 volts.

The PV modules are connected to a DC-DC converter or charge controller system with an input voltage range that includes 36 volts (30-40 volts for example) and boosts the voltage to an output voltage of 53 volts at the expected PV operating temperature.

The DC-DC converter is 90% efficient and causes an efficiency loss of 10% in Case 3 compared to the direct connection system in Case 1.

Step 8—

The optimization procedure in Steps 1-5 can be used to produce an optimal design for building an optimized solar-powered photovoltaic-electrolyzer system to generate hydrogen. The optimal design parameters are calculated using the method of Step 1 to measure the steady state operating voltage of the electrolyzer and using the method of Steps 2 and 3 to measure the operating efficiency of the electrolyzer in the range of permissible operating current and temperature. Next, the method of Step 3 is used to improve the electrolyzer operating efficiency if possible, and the desired operating current (and the resulting hydrogen generation rate and corresponding electrolyzer efficiency) are chosen. Next steps 4-6 are used to optimize the PV system efficiency.

There is a trade-off between high hydrogen generation and high efficiency. It is to be noted that increasing hydrogen generation rate by increasing the operating current $I_{oper}$ results in decreased efficiency.

In Case 1:
The electrolyzer efficiency is 70%.
The PV system efficiency is 18.2%
The overall solar energy to hydrogen conversion efficiency is 12.7%
The hydrogen production rate is 0.10 kg/hour.
The PV cell area is 26×1.027 m²=26.7 m². (measured area of the PV cells, usually obtainable from the manufacturer)
In Case 2—Control Example (Not to be Optimized):
The electrolyzer efficiency is 62%.
The PV system efficiency=150 watts/190 watts×19%=15%
The overall solar energy to hydrogen conversion efficiency is 9%

$$\text{Hydrogen rate} = I_{oper} / (N \times 26{,}806 \text{ amps/kg/hour})$$
$$= 111 \times 20 / 26{,}806$$
$$= 0.083 \text{ kg/hour}$$

The PV cell area is 30×1.027 m²=30.8 m².

Because the electrolyzer and the PV system were both not optimized Case 2 required a greater number, area, and cost of PV modules but produces less hydrogen per hour.

In Case 3:
The electrolyzer efficiency is 70%.
The PV system efficiency is 18.2%
The overall solar energy to hydrogen conversion efficiency is 12.7%
The hydrogen production rate is 0.10 kg/hour.
The PV cell area is 26×1.027 m²=26.7 m².
In Case 4:
The electrolyzer efficiency is 70%.
The PV system efficiency is 18.2%
The DC-DC converter efficiency is 90%.
The overall solar energy to hydrogen conversion efficiency is 11.4%
The hydrogen production rate is 0.09 kg/hour.
The PV cell area is 26×1.027 m²=26.7 m².
Step 9—

A method based on Steps 1-5 can also be used to continuously optimize and operate a solar-powered photovoltaic-electrolyzer system to generate hydrogen. Voltage and current sensors are connected to measure the operating voltage and current, of the photovoltaic-electrolyzer system, and temperature sensors are installed to measure the operating temperature of the photovoltaic modules. Then, a control system, comprising logic systems, control algorithms, electronic controllers, and switches (solenoid or other) is connected to the voltage, current, and temperature sensors, to control the operation and efficiency of the photovoltaic-electrolyzer system based on the sensor measurements. The control system functions to continuously optimize the system operation and efficiency by using signals from the sensors to control the number of solar cells connected in series and in parallel circuits in the photovoltaic modules to maintain the optimum PV system output voltage, equal to the desired electrolyzer operating voltage.

Alternatively, the system operation and efficiency can be continuously optimized by using signals from the control system to control the number of electrolysis cells connected in series and in parallel circuits in the electrolyzer to maintain the optimum system operating voltage. Alternatively, the system operation and efficiency can be continuously optimized by using signals from the control system to control the output voltage of a DC-DC converter or charge controller to maintain the optimum system operating voltage. One or a combination of the alternative control scenarios can be used to control the PV-electrolyzer operation.

Figure 9A:
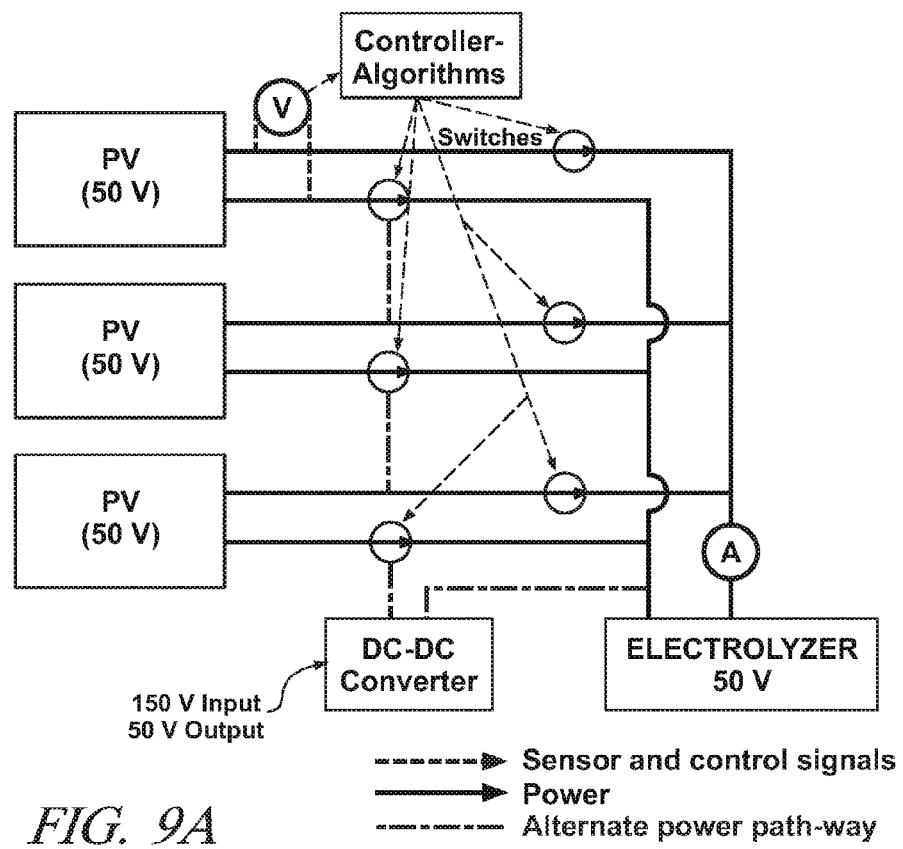
FIG. 9A is a schematic representation of a real time system for continual operation and control of a three module PV system in parallel connection for delivering direct current power at a predetermined operating level of 50 V to an electrolyzer. In this embodiment, operating voltage switches are employed for switching between direct connections of the PV modules to the electrolyzer and the insertion of a DC-DC Converter for a better match between maximum power point operation of the PV module array and the electrolyzer. Voltage, current, and temperature measurements are used by a programmed computer to control operation of the switches in using the converter.

One system of control switches and algorithms used for system control are shown schematically in FIG. 9A. This control system is designed to switch between two modes of PV-electrolyzer operation: (a) direct connection operation in periods of high solar irradiance (giving a high current and voltage) and (b) DC-DC converter operation to boost the operating voltage in periods of partial cloudiness when PV output voltage is too low for efficient operation by direct connection. The direct connection mode usually gives PV-electrolyzer operation at higher power and efficiency because adding a DC-DC converter to the circuit increases the resistance. The increase in resistance when using the DC-DC converter mode causes a decrease in the maximum power delivered to the electrolyzer and a decrease of 5%-10% in the hydrogen produced.

In FIG. 9A, the electrolyzer is being operated at 50 volts ($V_{oper}$=50 V). Three photovoltaic modules, each operating at their maximum power points, $V_{mpp}$=50V, are arranged in parallel connection to deliver sufficient operating current to the electrolyzer for required hydrogen production. The system is being operated by a pre-programmed controller (Controller-Algorithms). The controller may consist of a computer or other electronic control system with sufficient memory. The algorithms that govern the controller and decide when the controller will activate switches to make direct connection from the PV array to the electrolyzer or connect the PV array to the DC-DC converter instead are derived from the performance database or efficiency model for the electrolyzer and the several PV modules. The direct connection mode of the PV-electrolyzer system may be considered the default mode. In the direct connection mode, the $V_{oper}$ of the system equals the output voltage of the PV array ($V_{PV}$). The algorithm requires that if the operating voltage ($V_{oper}$ and $V_{PV}$) of the PV-electrolyzer in the direct connection mode drops below the lower limit of the optimum voltage range of the PV array ($V_{opt}$), the controller will switch the connections of the PV array to the DC-DC converter (the DC-DC converter mode) and away from the direct connection (default) mode.

A voltmeter and ammeter monitor the performance of the PV system and their respective data are monitored by the controller system. The voltmeter monitors when $V_{oper}$ drops below the preset value of $V_{opt}$ that is a characteristic value for the particular PV array used in the PV-electrolyzer. The performance database or efficiency model for the electrolyzer and the several PV modules is used to set $V_{opt}$, $V_{mpp}$, or $V_{PV}$ of the PV array or $V_{oper}$ of the electrolyzer under any conditions of temperature or current to be used by the controller logic. Electrical switches controlled by the controller algorithms permit changing automatically from the direct connection mode to DC-DC converter mode. If the $V_{PV}$ monitored by the controller in the FIG. 9A rises again to $V_{opt}$, the controller will automatically switch back to the direct connection mode (default). In this example, a DC-DC Converter may be switched into the PV power delivery system in the event the voltage ($V_{mpp}$) delivered by the three PV modules drops below the operating voltage of the electrolyzer and be taken out of the circuit again depending on the current level of solar radiation.

Figure 9B:
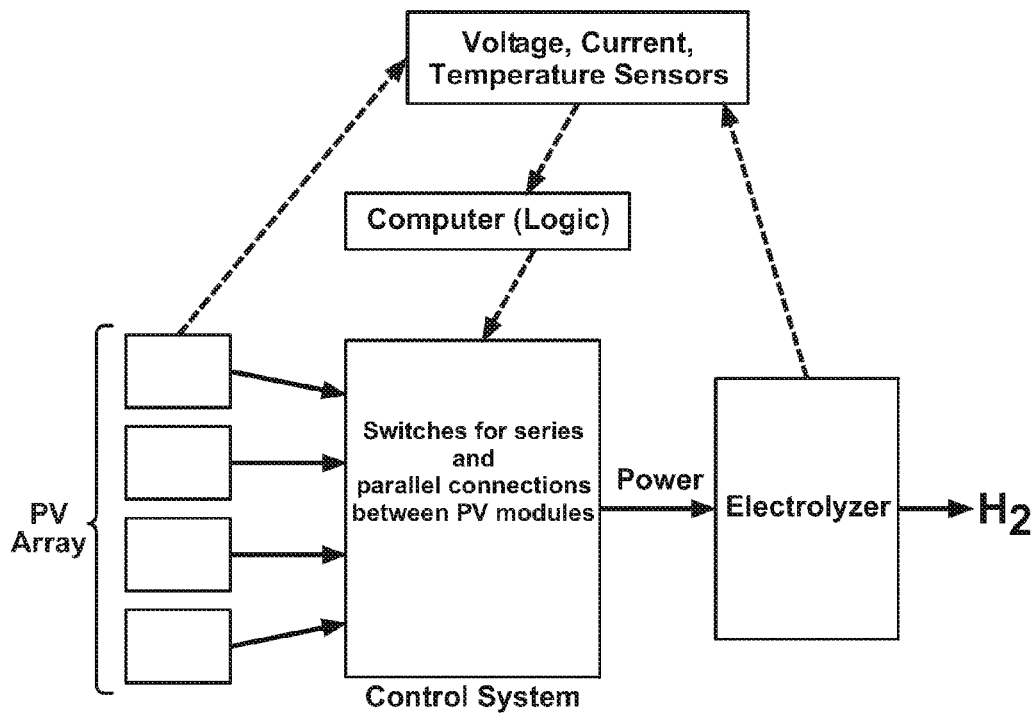
FIG. 9B is a schematic illustration of a real time system using computer-controlled electrical switches for producing different arrays of a group of PV modules to maintain maximum power point operation of the modules in delivering power to a hydrogen-producing electrolyzer. The system controls the number of PV modules connected in series and parallel to optimize the PV-electrolyzer efficiency.

FIG. 9B illustrates a second embodiment in which an Electrolyzer has a predetermined $V_{oper}$ and $I_{oper}$ for production of hydrogen. The optimum values of $V_{oper}$ and $I_{oper}$ are predetermined by the mathematical model for optimization of PV-electrolysis (see Table 1). A PV Array is provided to provide direct current power for operation of the electrolyzer. Voltage, Current, and Temperature Sensors are installed to monitor the operation of the array of photovoltaic cells. The PV array is interconnected with electrical switches to obtain combinations of series and/or parallel electrical connections between the respective modules. The mathematical model for optimization of PV-electrolysis (see Table 1) is based upon data obtained with a number of PV modules, DC-DC converters, and electrolyzer conditions. The performance characteristics of each array of PV modules is, thus, predetermined and stored in the database of a programmed controller (the controller may consist of a computer or other electronic control system with sufficient memory). An initial arrangement of some or all of the modules is arranged by control of the switches to deliver power (Ioper and $V_{oper}$) to the electrolyzer with the array of modules operating at their $V_{mpp}$. Should the solar irradiance change, or the temperature of the PV array change, or the operating temperature or current of the electrolyzer change, or the like, the controller can command a different switching arrangement for a new array of PV modules, still operating at the $V_{mpp}$ of the new array. The controller algorithm of the system in FIG. 9B controls the interconnections of PV modules and cells in the PV array so that the $V_{mpp}$ of the PV array will equal $V_{oper}$, the electrolyzer operating voltage. This condition gives the maximum efficiency and hydrogen production.

Figure 9C:
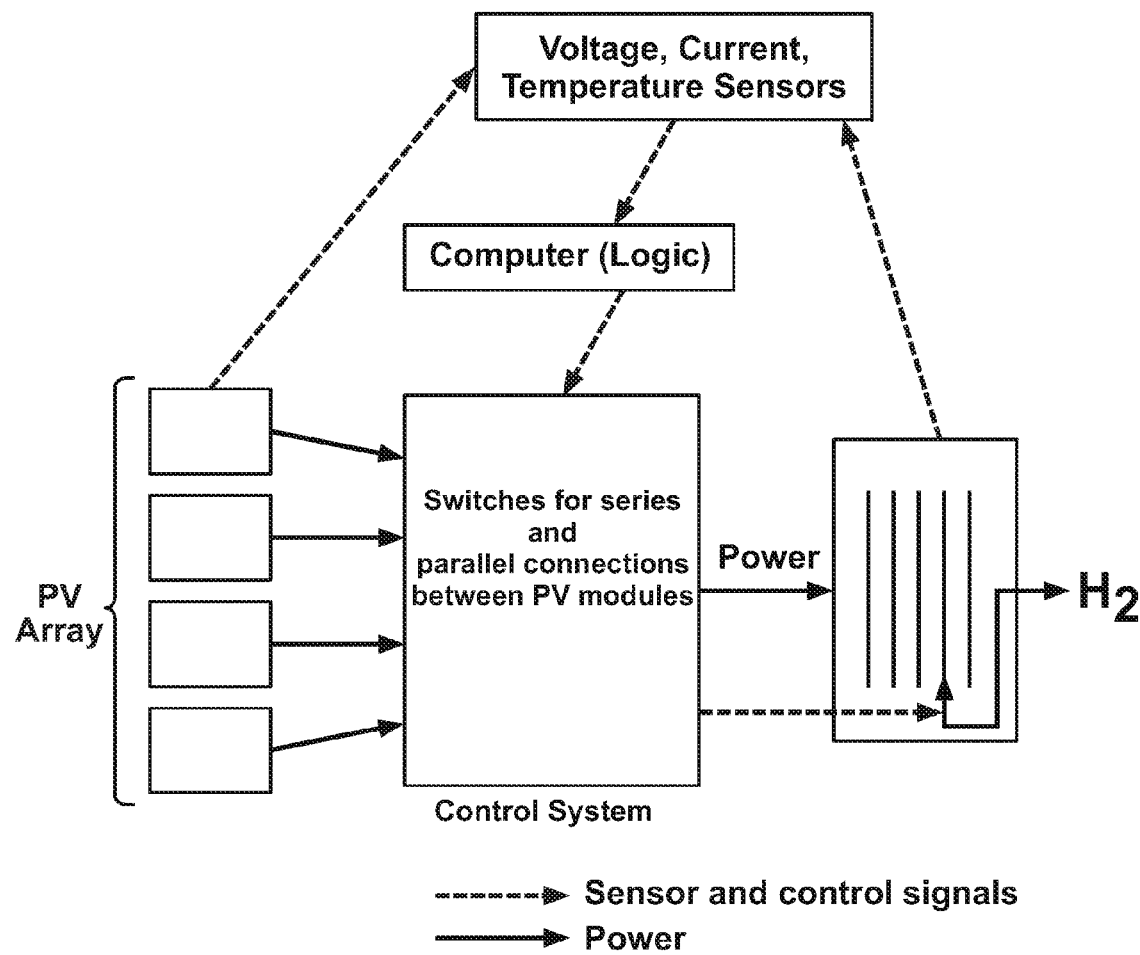
FIG. 9C is a schematic illustration of a real time system using computer-controlled electrical switches for controlling parallel/series arrangement of electrolytic cells in an electrolyzer for efficient joint operation of arrays of PV modules and the electrolyzer and to optimize PV-electrolyzer efficiency.

FIG. 9C illustrates another embodiment of the invention. In this embodiment, it is the number of electrolyzer cells, arranged in series and/or parallel connection, which can be varied to a desired change in hydrogen production rate or for balancing with the PV array. This figure is similar to that of FIG. 9B except that, as illustrated schematically, the change is made in the organization of the electrolyzer cells. The governing controller algorithm in this embodiment requires that the $V_{oper}$ of the electrolyzer cells must equal the $V_{mpp}$ of the PV array that is determined by the efficiency model as shown in Tables 1 and 4 under the operating conditions.

Photovoltaic Cooling Experiments

Tests were conducted of the effectiveness of cooling PV modules a sunny day in October. Cool tap water (21.4° C.) was applied for 3-5 minute periods to the surface of the PV modules using a hose and fine spray nozzle. A sensor attached to the back of each module was used to monitor temperature. The current-voltage-power curves of the modules were scanned before and after the cooling process. The results of these tests are summarized in Table 2.

TABLE 2

Photovoltaic Cooling Experiments

| PV Module | Initial Temp (° C.) | Final Temp (° C.) | Initial Power (W) | Final Power (W) | Increase in $P_{max}$ (%) |
|---|---|---|---|---|---|
| Sanyo HIP-190 | 41 | 24 | 181 | 191 | 5.5 |
| SunPower | 36 | 23 | 81 | 88 | 8.6 |

Optimization Model

Figure 10:
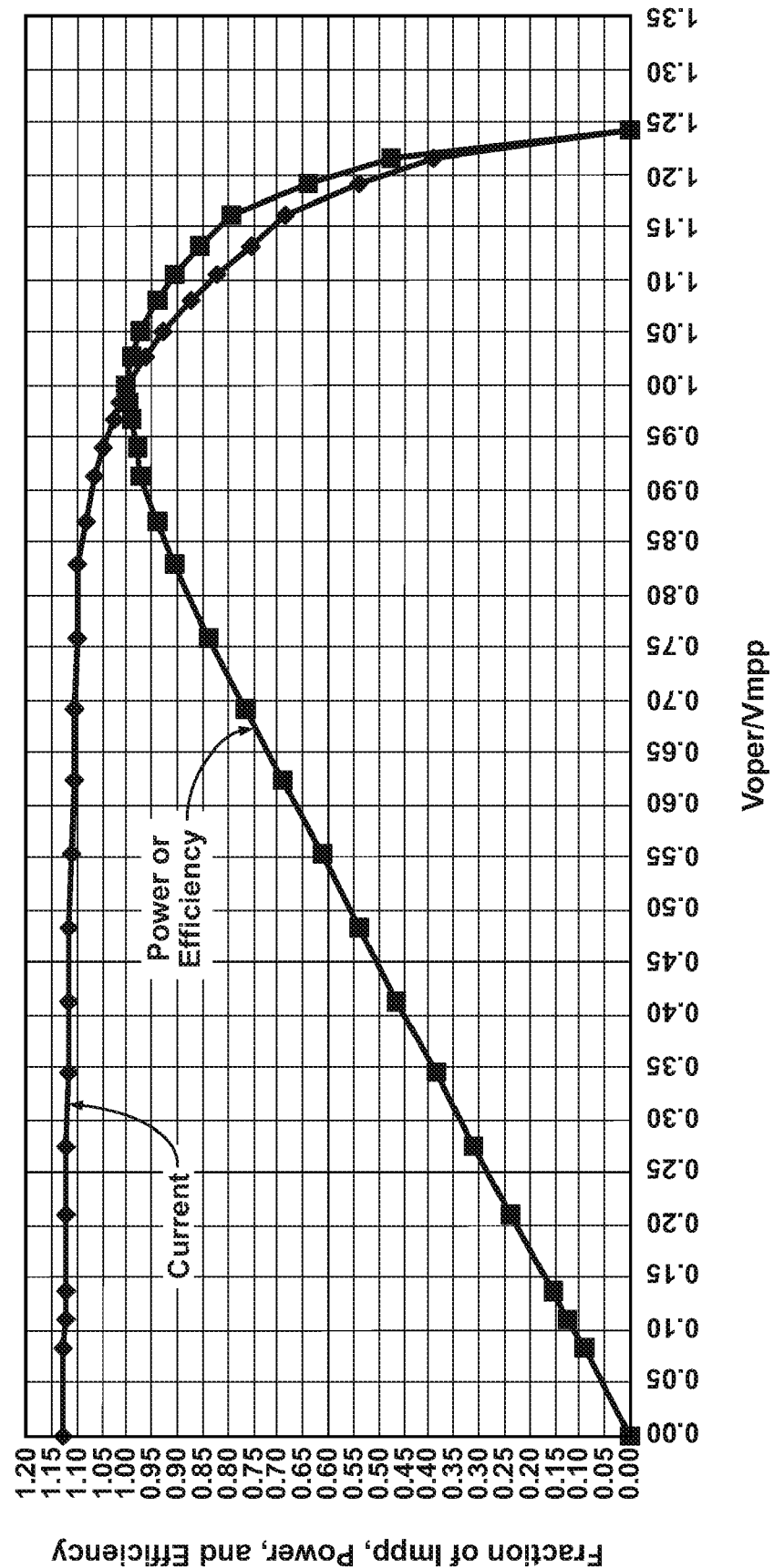
FIG. 10 is a normalized plot of PV module efficiency and other variables used to predict PV efficiency at $V_{oper}$.

An overall model of PV-electrolyzer efficiency was constructed and tested by comparison with the measured efficiency of hydrogen production in our database. This efficiency model was also the basis for building the stepwise procedure for optimizing PV-electrolysis efficiency. The steps of the procedure were selected by analyzing the terms used to model the efficiency. To estimate the efficiency of each PV system at $V_{oper}$, a typical IV plot for a crystalline silicon PV module (Sharp Solar NT-185U1) was normalized to show a relative efficiency of 1.0 at a $V_{mpp}$ of 1.0, i.e., the PV module would give full power at an irradiance of 1000 W/m$^2$ if its $V_{mpp}$ exactly equals $V_{oper}$ for the electrical load (FIG. 10). The fraction of the $V_{mpp}$ represented by the $V_{oper}$ was determined for each PV module, and by drawing a vertical line from the $V_{oper}/V_{mpp}$ value on the X-axis to the efficiency curve, it was possible to estimate the fraction of the full PV electrical efficiency available at $V_{oper}$. For example, if $V_{mpp}$ is 64 volts for module A and $V_{oper}$ is 32 volts, the fraction $V_{oper}/V_{mpp}$ is 0.5. Using the graph, a value of 0.5 ($V_{oper}/V_{mpp}$) on the X-axis corresponds to an efficiency of 0.58 on the Y-axis. Then, multiplying 0.58×the cell efficiency (at the MPP) of module A (say 14%) would give an estimated electrical efficiency of 0.58×14%=8.1% at $V_{oper}$.

Figure 11:
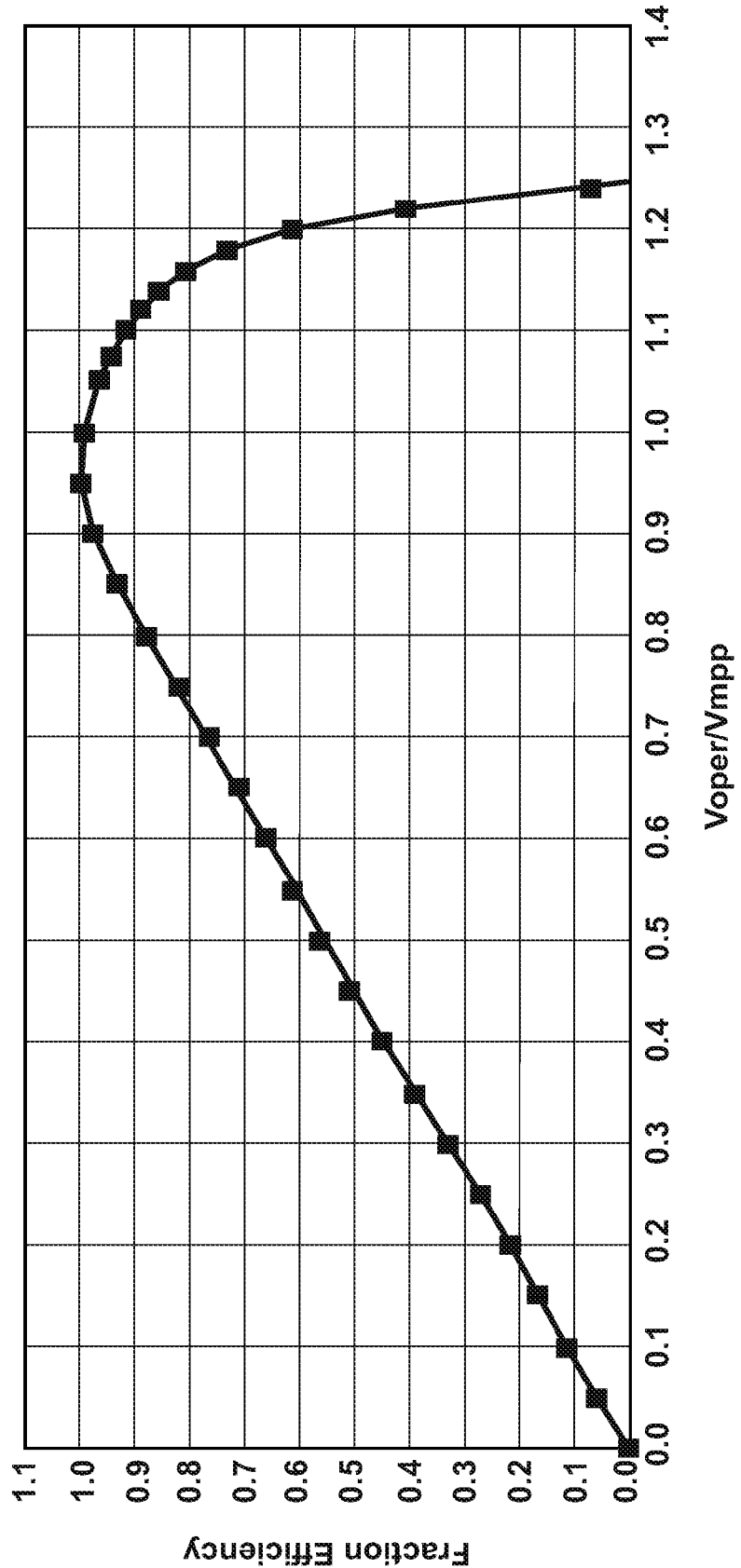
FIG. 11 is normalized plot based on a computer model for easy calculation of PV efficiency by interpolating new values of $V_{oper}/V_{mpp}$.

A mathematical model to predict the efficiency of PV modules was developed by fitting a curve to our experimental data shown in Table 1 and FIG. 10 using an 8-variable regression model developed using SAS software (FIG. 11). In order to estimate the predicted efficiency using this mathematical model more easily, a "clickable" Microsoft Excel™ model (based on the SAS regression model) for interpolation of new $V_{oper}/V_{mpp}$ values is included in this file as Table 3. To interpolate any desired value of $V_{oper}/V_{mpp}$ and find the corresponding PV system efficiency: double click with cursor positioned on the table, then, insert a row, enter the new $V_{oper}/V_{mpp}$ value, and press Tab key to read the model predicted efficiency.

TABLE 3

Clickable Microsoft Excel model (based on 8-variable regression model) for interpolation of new $V_{oper}/V_{mpp}$ values. To interpolate: double click with cursor positioned on the table, then, insert a row, enter the new $V_{oper}/V_{mpp}$ value, and press Tab key to read the model predicted efficiency.

| Voper/Vmpp | Efficiency Model (SAS) |
|---|---|
| 0 | 0.00 |
| 0.050 | 0.06 |
| 0.100 | 0.12 |
| 0.150 | 0.17 |
| 0.200 | 0.22 |
| 0.250 | 0.27 |
| 0.300 | 0.33 |
| 0.350 | 0.39 |
| 0.400 | 0.45 |
| 0.450 | 0.51 |
| 0.500 | 0.56 |
| 0.550 | 0.61 |
| 0.600 | 0.66 |
| 0.650 | 0.71 |
| 0.700 | 0.76 |
| 0.750 | 0.82 |
| 0.800 | 0.88 |
| 0.850 | 0.93 |
| 0.900 | 0.97 |
| 0.950 | 1.00 |
| 1.000 | 0.99 |
| 1.050 | 0.96 |
| 1.075 | 0.94 |
| 1.100 | 0.92 |
| 1.120 | 0.89 |
| 1.140 | 0.86 |
| 1.160 | 0.81 |
| 1.180 | 0.73 |

TABLE 3-continued

Clickable Microsoft Excel model (based on 8-variable regression model) for interpolation of new $V_{oper}/V_{mpp}$ values. To interpolate: double click with cursor positioned on the table, then, insert a row, enter the new $V_{oper}/V_{mpp}$ value, and press Tab key to read the model predicted efficiency.

| Voper/Vmpp | Efficiency Model (SAS) |
|---|---|
| 1.200 | 0.61 |
| 1.220 | 0.41 |
| 1.240 | 0.07 |
| 1.245 | −0.04 |

Figure 12:
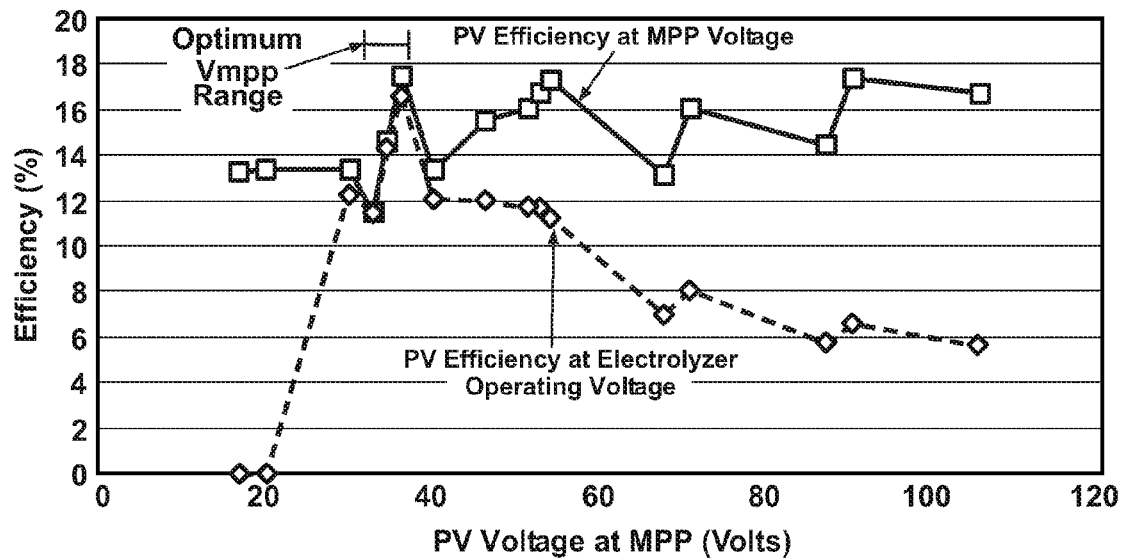
FIG. 12 is a graph showing a comparison of the electrical efficiencies of each kind of PV cell at its $V_{mpp}$ and at 32 volts the usual $V_{oper}$ of the electrolyzer system.

The efficiency of each PV system at its $V_{mpp}$ and $V_{oper}$ is plotted in FIG. 12. In FIG. 12, the PV efficiency curves for $V_{mpp}$ and $V_{oper}$ coincide in the range where the $V_{mpp}$ of the PV module is 33 to 36.2 volts because this range is approximately the $V_{oper}$ (32 volts) of the electrolyzer. This is the range where the efficiency of the PV modules is optimized and therefore, the range where most hydrogen is produced and system efficiency is highest. The optimum $V_{mpp}$ range (33 to 36.2 volts) is marked with heavy brackets in FIG. 12.

Solar radiation heats the PV modules during daylight illumination when they operate hotter than the ambient temperature, and this decreases their power output and electrical efficiency. While the $V_{mpp}$ and other specifications of the PV modules are measured under the standard test conditions (STC), which are 1 kW/m² at a spectral distribution of AM1.5 (global spectral irradiance) and cell temperature (PV T) of 25° C., the PV modules frequently operate at hotter conditions like the Nominal Operating Cell Temperature (NOCT) which is ~47° C. that occurs under standard operating conditions (ambient temperature of 20° C., solar irradiance of 0.8 kW/m², and wind speed of 1 m/s). Temperatures rise even higher than 47° C. under hot sunny conditions. Thus, it is necessary to correct the predicted efficiency by subtracting a temperature coefficient (0.45% per ° C.) times the number of degrees increase in temperature to get the temperature-corrected value for the predicted efficiency (Equation 9).

Corrected efficiency=Uncorrected Efficiency−(PV T ° C.−25)×0.45%/° C.  Equation 9:

The temperature coefficient reported for six PV modules (Solarex, Shell Solar, Astropower, Siemens, BP Solar, and Sanyo) ranged from 0.33%/° C. to 0.52%/° C. with most materials having a coefficient near the average value of 0.45%/° C. The average PV coefficient of 0.45%/° C. was used in the predictive model (Table 1).

Figure 13:
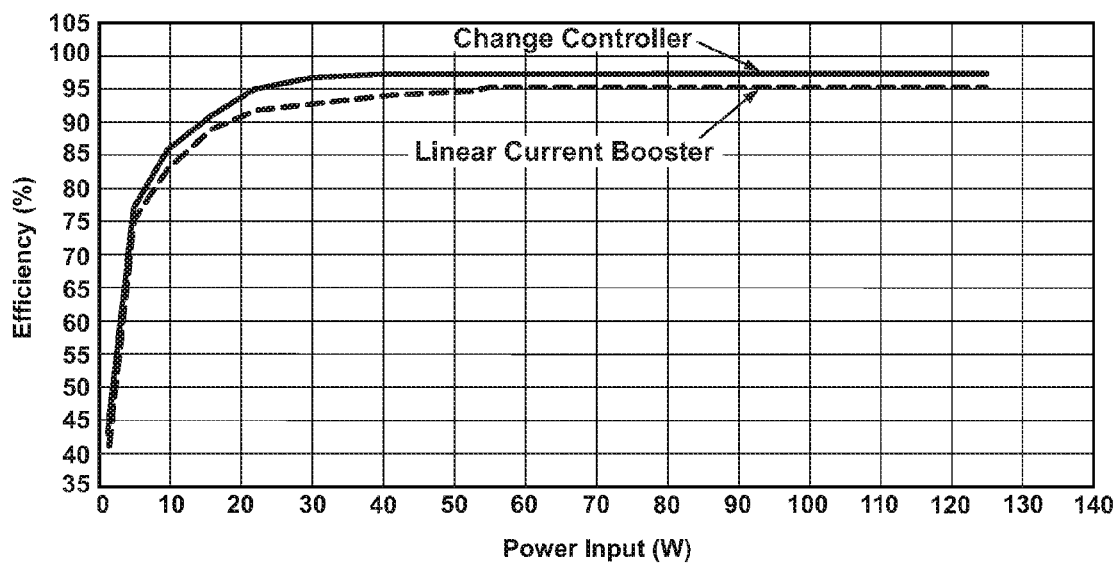
FIG. 13 is a graph of percent efficiency versus power input (W) for DC-DC converters used in the PV-E systems.

In the model of PV-electrolysis with a DC-DC converter for optimization shown in Table 4, an additional term must be added to account for the efficiency loss due to the resistance added to the circuit by the DC-DC converter. The predicted PV-electrolyzer efficiency must be multiplied by the measured efficiency of the DC-DC converter to get the correct predicted efficiency of the overall DC-DC converter PV electrolyzer system (Equation 5). The measured efficiencies of DC-DC converters, i.e., the output power of the converter ($I_{out} \times V_{out}$) divided by the power input ($I_{in} \times V_{in}$), for two types of DC-DC converters, a Solar Converters Ltd. model 48-10 Linear Current Booster (LCB) and a Solar Converters Ltd. Charge Controller model 48-20, are shown in FIG. 13. The values of DC-DC converter efficiency used in Table 3 were estimated from FIG. 13: For the LCB, 95.2%; for the Charge controller, 97.2%.

Figure 14:
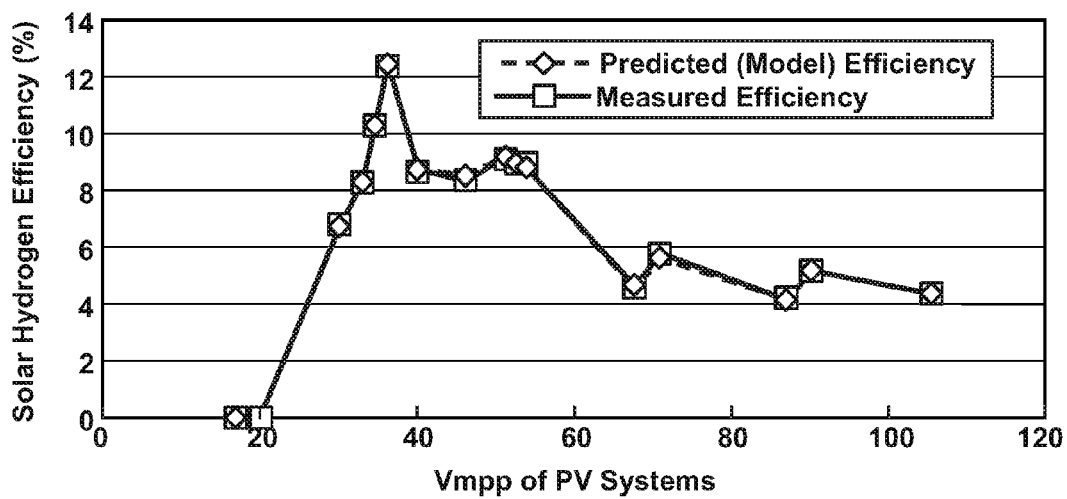
FIG. 14 is a graph of solar hydrogen efficiency (%) versus $V_{mpp}$ (volts) of PV systems comparing measured efficiency and predicted efficiency for solar hydrogen generation by direct connection PV-electrolyzer systems.
Figure 15:
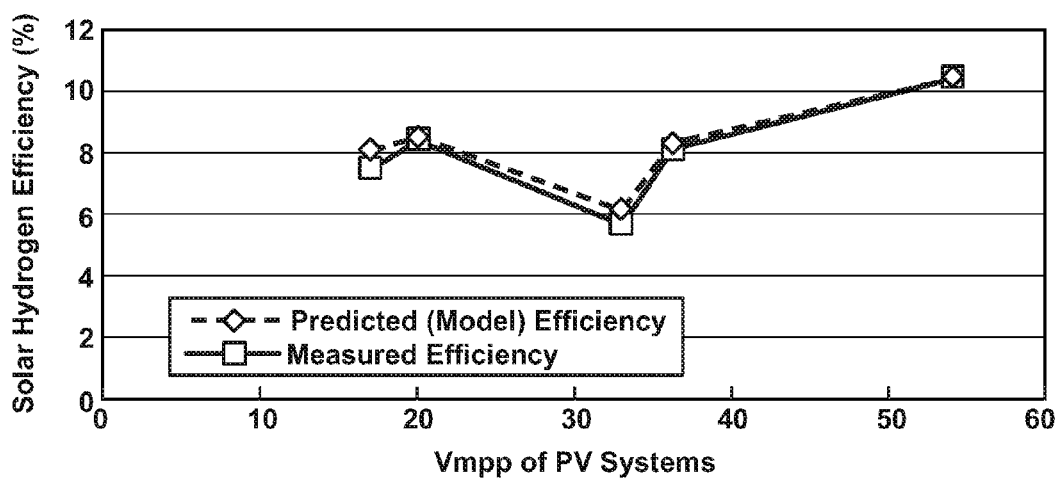
FIG. 15 is a graph of solar hydrogen efficiency (%) versus $V_{mpp}$ (volts) of PV systems comparing measured efficiency and predicted efficiency for solar hydrogen generation with PV-electrolyzer systems using DC-DC converters.

FIG. 14 shows the model solar hydrogen generation efficiencies of 15 PV-electrolyzer tests estimated from the predictive model for direct connection PV-electrolyzers (Table 1) and based on the electrolyzer efficiency and PV efficiency at $V_{oper}$ including the effects of interactions between the two systems and the PV temperature effects. The two curves are generally quite close. The greatest difference between the two sets of values is only 0.1% efficiency. FIG. 15 compares the predicted and measured efficiencies of DC-DC Converter PV-electrolyzer systems as modeled in Table 4. FIGS. 14 and 15 demonstrate that the models can predict the system efficiencies with an average accuracy of <+0.1% for direct connection and ±0.4% for DC-DC converter PV-electrolyzers.

TABLE 4

Model for Efficiency of PV-Electrolyzer Systems with DC—DC Converter (MPP Tracking)

| PV No. | Irradiance kW/m2 | DC—DC Conv. I input A | DC—DC Conv. V input VDC | DC—DC Conv. I output A | DC—DC Conv. V ouput VDC | Vmpp VDC | Vinput/ Vmpp | Fraction of PV Effic at V input | PV Effic at V mpp % | PV Effic at Vinput % | Effic DC—Converter % | Effic Electrolyzer | Predicted Effic PV-E System % | PV Temp −25 ° C. | Model Predicted Effic, Temp Corr. % | Measured Effic PV-E % |
|---|---|---|---|---|---|---|---|---|---|---|---|---|---|---|---|---|
| 8 | 0.96 | 6.36 | 17.87 | 3.44 | 31.6 | 20.0 | 0.894 | 0.965 | 13.4 | 12.9 | 95.7 | 0.78 | 9.6 | 17 | 8.5 | 8.4 |
| 8 | 0.96 | 6.38 | 17.86 | 3.43 | 31.66 | 20.0 | 0.893 | 0.96 | 13.4 | 12.9 | 95.3 | 0.78 | 9.5 | 17 | 8.4 | 8.4 |
| 3 | 0.96 | 3.05 | 17.79 | 1.66 | 31.08 | 17.0 | 1.046 | 0.98 | 13.3 | 13.0 | 95.1 | 0.79 | 9.8 | 26 | 8.1 | 7.5 |
| 3 | 0.96 | 3.06 | 17.78 | 1.67 | 31.12 | 17.0 | 1.046 | 0.98 | 13.3 | 13.0 | 95.5 | 0.79 | 9.8 | 26 | 8.1 | 7.6 |
| 10 | 0.77 | 1.9 | 56.7 | 3.27 | 31.27 | 54.0 | 1.050 | 0.98 | 17.3 | 17.0 | 94.9 | 0.79 | 12.7 | 22 | 10.8 | 10.1 |
| 10 | 0.77 | 2.01 | 56.7 | 3.38 | 31.2 | 54.0 | 1.050 | 0.98 | 17.3 | 17.0 | 92.5 | 0.79 | 12.4 | 22 | 10.5 | 10.4 |
| 10 | 0.86 | 2.21 | 56.6 | 3.82 | 31.16 | 54.0 | 1.048 | 0.98 | 17.3 | 17.0 | 95.2 | 0.79 | 12.7 | 22 | 10.9 | 10.5 |
| 12 | 0.95 | 2.43 | 35.34 | 2.7 | 31.13 | 33.0 | 1.071 | 0.95 | 11.5 | 10.9 | 97.9 | 0.79 | 8.4 | 41 | 6.2 | 5.7 |
| 12 | 0.99 | 1.83 | 35.3 | 2.04 | 30.66 | 33.0 | 1.070 | 0.95 | 11.5 | 10.9 | 96.8 | 0.80 | 8.5 | 52 | 5.7 | 4.2 |
| 13 | 0.99 | 3.7 | 35.39 | 4.01 | 31.68 | 36.2 | 0.978 | 1.00 | 17.5 | 17.5 | 97.0 | 0.78 | 13.2 | 50 | 8.8 | 9.4 |
| 13 | 1.01 | 3.2 | 37.01 | 3.51 | 31.49 | 36.2 | 1.022 | 0.98 | 17.5 | 17.2 | 93.3 | 0.78 | 12.5 | 49 | 8.3 | 8.1 |

Practices of the invention have been illustrated by examples. These examples are intended only to be illustrative of the invention and not limiting of its scope.

The invention claimed is:

1. A method for operation of a hydrogen-producing electrolyzer powered by two or more available photovoltaic modules, an array of modules, irradiated by sunlight, the electrolyzer having two or more electrolytic cells and having an operating direct current and an operating voltage, one or more photovoltaic modules being connectable in parallel or series circuit arrangement to form different arrays of module(s) for delivery of direct current power to the electrolyzer cells where a given array of module(s) may include less than the total number of available modules, the method comprising: pre-determining maximum power point operating voltages for representative arrays of module(s); determining an operating current and operating voltage for the electrolyzer for a desired hydrogen production rate; and selecting and employing a photovoltaic array of module(s), as a presently operating array, to operate at its maximum power point voltage for delivery of the determined operating current and operating voltage to the electrolyzer.

2. A method for operation of a hydrogen-producing electrolyzer as recited in claim 1, the method further comprising: continually monitoring the operating voltage of the presently operating photovoltaic array of modules; and selecting and employing a new array of modules to operate at its maximum power point voltage for delivery of the determined operating current and operating voltage to the electrolyzer when the presently operating array of modules is not operating at its maximum power point voltage.

3. A method for operation of a hydrogen-producing electrolyzer as recited in claim 2 in which a presently operating array of modules is converted to a new array of modules by the switching of electrical connections between two or more modules.

4. A method for operation of a hydrogen-producing electrolyzer as recited in claim 2 in which a presently operating array of modules is converted to a new array of modules by the substitution of one or more different modules.

5. A method for operation of a hydrogen-producing electrolyzer as recited in claim 1, the method further comprising: interconnecting a DC-DC converter between a presently operating array of module(s) and the electrolyzer to improve the match between the maximum power point voltage of the presently operating array and the operating voltage of the electrolyzer.

6. A method for operation of a hydrogen-producing electrolyzer as recited in claim 1, the method further comprising: continually measuring the operating temperature of the module(s) in the presently operating array, and cooling the modules in the presently operating array when the operating temperature increases and lowers the maximum power point voltage of the array.

7. A method for operation of a hydrogen-producing electrolyzer as recited in claim 6 comprising using a flow of a cooling fluid on the module or modules to decrease the steady-state module operating temperature.

8. A method for operation of a hydrogen-producing electrolyzer as recited in claim 2 in which the new array of modules comprises more modules in series connection than the previous array of modules.

9. A method for operation of a hydrogen-producing electrolyzer powered by an array of photovoltaic modules irradiated by sunlight, the electrolyzer having a plurality of electrolytic cells connectable in parallel or series arrangement and having an operating direct current and an operating voltage, the photovoltaic modules being connectable in parallel or series arrangement to form different arrays for delivery of direct current power to the electrolyzer, the method comprising: pre-determining maximum power point operating voltages for representative arrays of the modules; determining a first operating current and operating voltage for the electrolyzer for a desired hydrogen production rate; selecting a first array of the photovoltaic modules to operate at its maximum power point voltage for delivery of the determined operating current and operating voltage to the electrolyzer; and thereafter altering the hydrogen production rate of the electrolyzer by changing its operation to a second operating current and operating voltage; and selecting a second array of the photovoltaic modules to operate at a second array maximum power point voltage for delivery of the second operating current and operating voltage to the electrolyzer.

10. A method for continuously optimizing the operation of a solar-powered photovoltaic-electrolyzer system to generate hydrogen, the electrolyzer being powered by a group of two or more available photovoltaic modules irradiated by sunlight, the electrolyzer having two or more electrolytic cells connectable in series or parallel circuits with variable operating direct current values and operating voltage values, the photovoltaic system comprising one or more photovoltaic modules connectable in parallel or series circuit arrangement to form different arrays of module(s) for delivery of direct current power to the electrolyzer cells where a given array may include less than the total number of available modules; the method comprising: continually measuring the operating voltage and current of the photovoltaic-electrolyzer system; continually measuring the operating temperature of the photovoltaic modules; and using a pre-programmed computer control system, comprising a mainframe or microprocessor and associated circuits, switches, and wiring, to continually receive present values of system operating current and voltage, and photovoltaic module temperature and to use the values to select and employ a present photovoltaic array of module(s) having a maximum power point close to the present operating voltage of the electrolyzer system, the computer having a database of maximum power point values related to operating temperatures for available photovoltaic arrays of module(s).

11. A method for continuously optimizing the operation of a solar-powered photovoltaic-electrolyzer system as recited in claim 10 in which the pre-programmed computer control system, comprising a mainframe or microprocessor and associated circuits, switches, and wiring, controls the number of photovoltaic modules connected in series and in parallel circuits to maintain the optimum operating voltage.

12. A method for continuously optimizing the operation of a solar-powered photovoltaic-electrolyzer system as recited in claim 11 in which the pre-programmed computer, comprising a mainframe or microprocessor and associated circuits, switches, and wiring, directs the substitution of a new photovoltaic array of modules for a present array of modules by the switching of electrical connections between one or more modules.

13. A method for continuously optimizing the operation of a solar-powered photovoltaic-electrolyzer system as recited in claim 11 in which the pre-programmed computer, comprising a mainframe or microprocessor and associated circuits, switches, and wiring, directs the substitution of a new photovoltaic array of modules for a present array of modules by the substitution of one or more different modules.

14. A method for continuously optimizing the operation of a solar-powered photovoltaic-electrolyzer system as recited in claim 10 in which the pre-programmed computer control system, comprising a mainframe or microprocessor and associated circuits, switches, and wiring, controls the output voltage of a DC-DC converter to adjust the maximum power point voltage of the presently operating array of modules closer to the operating voltage of the electrolyzer.

15. A method for continuously optimizing the operation of a solar-powered photovoltaic-electrolyzer system as recited in claim 10 in which the pre-programmed computer control system, comprising a mainframe or microprocessor and associated circuits, switches, and wiring, controls the number of electrolysis cells connected in series and in parallel circuits in the electrolyzer to maintain the optimum system operating voltage.

* * * * *